US011407275B2

(12) United States Patent
Durrani et al.

(10) Patent No.: US 11,407,275 B2
(45) Date of Patent: Aug. 9, 2022

(54) HEAT FLOW MANAGEMENT DEVICE AND METHOD FOR OPERATING A HEAT FLOW MANAGEMENT DEVICE

(71) Applicant: Hanon Systems, Daejeon (KR)

(72) Inventors: Navid Durrani, Kerpen (DE); Martin Hötzel, Ratingen (DE); Tobias Haas, Cologne (DE)

(73) Assignee: Hanon Systems, Daejeon (KR)

(*) Notice: Subject to any disclaimer, the term of this patent is extended or adjusted under 35 U.S.C. 154(b) by 447 days.

(21) Appl. No.: 16/411,672

(22) Filed: May 14, 2019

(65) Prior Publication Data

US 2019/0366800 A1 Dec. 5, 2019

(30) Foreign Application Priority Data

May 31, 2018 (DE) ........................ 102018113038.4
Apr. 12, 2019 (DE) ........................ 102019109796.7

(51) Int. Cl.
*B60H 1/00* (2006.01)
*B60H 1/03* (2006.01)
(Continued)

(52) U.S. Cl.
CPC ......... *B60H 1/00735* (2013.01); *B60H 1/004* (2013.01); *B60H 1/00021* (2013.01);
(Continued)

(58) Field of Classification Search
CPC .. B60H 1/00735; B60H 1/0021; B60H 1/004; B60H 1/00485; B60H 1/00885;
(Continued)

(56) References Cited

U.S. PATENT DOCUMENTS

2008/0251235 A1* 10/2008 Zhou ....................... B60L 3/003
165/41
2010/0012295 A1* 1/2010 Nemesh .............. H01M 10/663
165/104.19
(Continued)

FOREIGN PATENT DOCUMENTS

CN 107444103 A 12/2017
DE 102010023178 A1 12/2011
(Continued)

*Primary Examiner* — Travis Ruby
(74) *Attorney, Agent, or Firm* — Norton Rose Fulbright US LLP; James R. Crawford

(57) ABSTRACT

Heat flow management device for motor vehicles has a refrigerant circulation, a power train coolant circulation and a heating line heat carrier circulation. The refrigerant circulation includes a compressor, an indirect condenser, an expansion element, an ambient heat exchanger, an evaporator and a chiller. The power train coolant circulation includes a coolant pump, the chiller, an electric motor heat exchanger and a power train coolant radiator, wherein the heating line heat carrier circulation comprises a coolant pump, the indirect condenser and a heating heat exchanger, wherein the refrigerant circulation and the power train coolant circulation are directly thermally coupled with one another across the chiller. Refrigerant circulation and heating line heat carrier circulation are directly thermally coupled with one another across the indirect condenser. Power train coolant circulation and the heating line heat carrier circulation are only indirectly thermally coupled with one another across the refrigerant circulation.

13 Claims, 15 Drawing Sheets

(51) Int. Cl.

| | |
|---|---|
| ***B60H 1/14*** | (2006.01) |
| ***B60H 1/22*** | (2006.01) |
| ***B60H 1/32*** | (2006.01) |

(52) U.S. Cl.

CPC ..... *B60H 1/00485* (2013.01); *B60H 1/00885* (2013.01); *B60H 1/00907* (2013.01); *B60H 1/034* (2013.01); *B60H 1/143* (2013.01); *B60H 1/2221* (2013.01); *B60H 1/3213* (2013.01); *B60H 1/00278* (2013.01); *B60H 2001/00121* (2013.01); *B60H 2001/00128* (2013.01); *B60H 2001/00164* (2013.01); *B60H 2001/00942* (2013.01); *B60H 2001/00961* (2019.05); *B60H 2001/225* (2013.01); *B60H 2001/2287* (2013.01)

(58) Field of Classification Search

CPC .... B60H 1/00907; B60H 1/034; B60H 1/143; B60H 1/2221; B60H 1/3213; B60H 1/00278; B60H 1/00392; B60H 1/00914; B60H 1/00921; B60H 1/32284; B60H 2001/00961; B60H 2001/00121; B60H 2001/00128; B60H 2001/00164; B60H 2001/00942; B60H 2001/225; B60H 2001/2287; B60H 2001/00949; B60H 2001/00928; B60H 2001/3255–3264

See application file for complete search history.

(56) References Cited

U.S. PATENT DOCUMENTS

| | | | | |
|---|---|---|---|---|
| 2012/0247716 | A1* | 10/2012 | Galtz ........................ | B60L 1/02 165/42 |
| 2012/0297809 | A1* | 11/2012 | Carpenter ............... | B60L 50/66 62/244 |
| 2012/0304674 | A1* | 12/2012 | Schwarzkopf ..... | B60H 1/32281 62/79 |
| 2013/0269911 | A1* | 10/2013 | Carpenter .............. | B60H 1/143 165/104.13 |
| 2014/0069123 | A1* | 3/2014 | Kim ....................... | B60H 1/143 62/61 |
| 2014/0374060 | A1 | 12/2014 | Labaste Mauhe et al. | |
| 2015/0174986 | A1* | 6/2015 | Satzger .............. | B60H 1/00921 165/41 |
| 2015/0362268 | A1* | 12/2015 | Maeda ............... | B60H 1/00885 165/294 |
| 2016/0107508 | A1* | 4/2016 | Johnston ............. | H01M 10/663 165/202 |
| 2016/0257179 | A1* | 9/2016 | Miyakoshi .............. | B60L 1/003 |
| 2017/0008407 | A1* | 1/2017 | Porras ................ | B60H 1/00278 |
| 2017/0021698 | A1* | 1/2017 | Hatakeyama .......... | B60H 1/143 |
| 2017/0054188 | A1* | 2/2017 | Blatchley ............ | H01M 10/613 |
| 2017/0088006 | A1* | 3/2017 | Blatchley ........... | B60H 1/00885 |
| 2017/0106725 | A1* | 4/2017 | Kim ................... | B60H 1/00278 |
| 2017/0158081 | A1* | 6/2017 | Kim ................... | H01M 10/617 |
| 2017/0197488 | A1 | 7/2017 | Kim et al. | |
| 2017/0253105 | A1* | 9/2017 | Allgaeuer .......... | B60H 1/00385 |
| 2017/0282676 | A1* | 10/2017 | Janier ................ | B60H 1/00921 |
| 2017/0361677 | A1* | 12/2017 | Kim ...................... | F25B 25/005 |
| 2018/0001784 | A1* | 1/2018 | Porras ....................... | F25B 5/02 |
| 2018/0065444 | A1* | 3/2018 | Allgaeuer .......... | B60H 1/00385 |
| 2018/0072130 | A1* | 3/2018 | Kim ................... | B60H 1/32281 |
| 2018/0097266 | A1* | 4/2018 | Jalilevand ............ | B60H 1/3205 |
| 2018/0117984 | A1* | 5/2018 | Kim ................... | B60H 1/00278 |
| 2018/0117985 | A1* | 5/2018 | Kim ................... | B60H 1/00921 |
| 2018/0117986 | A1* | 5/2018 | Kim ................... | B60H 1/00278 |
| 2018/0117991 | A1* | 5/2018 | Kim ................... | B60H 1/00392 |
| 2018/0208014 | A1* | 7/2018 | Ben Ahmed ....... | B60H 1/00899 |

FOREIGN PATENT DOCUMENTS

| | | | |
|---|---|---|---|
| DE | 102013206626 | A1 | 10/2014 |
| DE | 102014206770 | A1 | 10/2015 |
| DE | 102016007490 | A1 | 12/2017 |
| JP | 2012017056 | A | 1/2012 |
| JP | 2015186989 | A | 10/2015 |
| KR | 20170008603 | A | 1/2017 |
| KR | 20170085160 | A | 7/2017 |

* cited by examiner

HEAT FLOW MANAGEMENT DEVICE AND METHOD FOR OPERATING A HEAT FLOW MANAGEMENT DEVICE

This application claims priority from German Patent Application Nos. 102018113038.4 filed on May 31, 2018 and 102019109796.7 filed on Apr. 12, 2019. The entire contents of these applications are incorporated herein by reference in their entirety.

FIELD OF THE INVENTION

The invention relates to a heat flow management device as a component of a climate control system for high-efficiency motor vehicles with low exhaust or lost heat generation.

BACKGROUND OF THE INVENTION

The invention relates in particular to a heat flow management system for electric vehicles (EV), vehicles with hybrid drive (HEV), plug-in hybrids (PHEV) or fuel cell vehicles, which are at least partially driven electromotively and which are equipped with high-voltage batteries or accumulators.

Prior art discloses that electric vehicles, vehicles with electric drive as well as also driven by internal combustion engine, so-called hybrids, fuel cell vehicles and high-efficiency vehicles driven by internal combustion engine do not generate sufficient exhaust or lost heat to heat the passenger compartment during the winter commensurate with the requirement of thermal comfort.

A cost-effective and space-saving solution of this problem is an electric heater which is operated as a Positive Temperature Coefficient (PTC) heater in combination with a conventional chiller. The chiller cools the air flowing into the vehicle cabin and the electric heater heats it appropriately.

Another, more efficient, solution of this problem is represented by a climate control system with heat pump function, which, however, requires markedly more installation space than the precedingly described solution that uses an electric heater.

The heat pump systems of motor vehicles, in particular of passenger vehicles, have significant common characteristics:

In cooling mode the heat required for evaporating the refrigerant is absorbed from the air flowing into the passenger compartment or from a coolant circulation. The coolant circulation is used, for example, to cool electric components. In electrically driven vehicles those are, for example, the traction battery, the inverter or the converter.

In the condenser/gas cooler of the refrigerant circulation, connection configured as chiller, the absorbed heat is output to the environment at a higher temperature level.

In heating mode the heat necessary for the evaporation of the refrigerant circulation operated as heat pump, is absorbed from an exhaust or lost heat source. In the (interior space) condenser/gas cooler of the refrigerant circulation operated as heat pump the heat is output at a high temperature level via the inflowing air to the vehicle cabin for heating.

In heat pump systems the ambient air is normally utilized as one of the main heat sources. The refrigerant is evaporated thereby that heat is absorbed from ambient air. This takes place either directly in a refrigerant-air heat exchanger or indirectly in a refrigerant-coolant heat exchanger.

The capacity and efficiency of a heat pump system depends in large measure on the quantity of heat at which temperature level is available for the evaporation of the refrigerant. Additionally, at cold ambient temperatures the heat absorption from the ambient air is limited in order to prevent the ambient heat exchanger from icing over. The maximal temperature difference between the air entering the ambient outdoor air heat exchanger and the temperature of the refrigerant is limited. The maximal heat absorbed from the ambient air is limited by this temperature difference.

Icing-over of the ambient heat exchanger impairs the heat transfer between air and refrigerant resulting in the reduction of the capacity absorbed from ambient air and consequently leads to the efficiency degradation of the entire heat pump system.

Due to the necessity of having to avoid the icing-over of the ambient heat exchanger, it is not possible at very low ambient temperatures to heat the vehicle cabin adequately if only ambient air is utilized as a heat source. Therefore, an additional heat exchanger acting as evaporator, the so-called chiller, is integrated into the refrigerant circulation at the low pressure side. The chiller permits further heat absorption from the water/glycol coolant circulation. The water/glycol coolant circulation cools for example the components of the electric power train and possibly also the battery cells of the high-voltage battery. By means of low temperature heat exchangers this water/glycol coolant circulation permits also the output of the exhaust or lost heat directly to the environment without necessarily having to operate the refrigerant circulation. However, due to the multiplicity of the components conventionally required for such a system, the system complexity is increased and consequently also the system costs for each vehicle.

According to prior art, consequently a comparatively favorable solution of the problem with relative low complexity of apparatus comprises a combination of a chiller with a high-voltage PTC auxiliary heater. However, these systems entail the disadvantage of high energy consumption at simultaneously low blow-out temperatures of the air for heating the passenger cabin, especially in cold regions. The electric auxiliary heater is not energy efficient and, beyond that, shortens the range of electric battery operated vehicles. The electric auxiliary heater is also only rarely used.

US 2017/0197488 A1 discloses a battery temperature control device for vehicles and a climate control system with same. A refrigerant circulation and several coolant circulations are herein provided so as to be able to supply heat simultaneously to the battery and to the interior of the vehicle. For this purpose, an auxiliary electric heater is additionally provided and integrated into the battery cooling circulation.

Heat pump systems, on the other hand, are complex due to the multiplicity of additional components, in such manner as heat exchanger, refrigerant valves and expansion elements.

Heat pump systems with an outside heat exchanger, also termed ambient heat exchanger, are often implemented such that, in comparison to pure cooling mode, a flow direction reversal is required for switching over to heating mode. This switching over can only be carried out with the refrigerant compressor deactivated. This can possibly lead to an unintentional lowering or raising of the blast-out temperature of the air into the interior of the vehicle cabin when changing operating modes.

The invention addresses the problem of providing a heat flow management device with a refrigerant circulation with heat pump functionality which, for heating as well as for cooling under stationary conditions, can provide efficient heat or cold for the passenger cabin of a vehicle.

SUMMARY OF THE INVENTION

The problem is resolved through a heat flow management device and through a method for operating this device with the characteristics according to the invention described herein.

The problem addressed by the invention is in particular resolved through a heat flow management device for motor vehicles, which as basic components comprises a refrigerant circulation, a power train coolant circulation and a heating line heat transfer medium or heat carrier circulation.

The refrigerant circulation comprises a compressor, an indirect condenser, an expansion element and an associated ambient heat exchanger, wherein the ambient heat exchanger, after restriction of the refrigerant, is operable as evaporator in heat pump mode. There is further provided at least one evaporator with associated expansion element for the climate control of the air for the vehicle cabin and a chiller with associated expansion element for cooling the power train coolant circulation.

The power train coolant circulation comprises a coolant pump, the chiller and an electric motor heat exchanger and a power train coolant radiator. The heating line heat carrier circulation comprises a coolant pump, the indirect condenser and a heating heat exchanger, with the heating heat exchanger being disposed in a climate control unit.

The refrigerant circulation and the power train coolant circulation are directly thermally coupled with one another across the chiller. Direct coupling means that the chiller is implemented as a fluid-fluid heat exchanger and the two fluid circulations in the chiller can each transfer to the other fluid circulation.

The refrigerant circulation and the heating line heat carrier circulation are also thermally coupled directly across the indirect condenser. The indirect condenser is again implemented as a fluid-fluid heat exchanger and the refrigerant circulation can transfer heat to the heating line heat carrier circulation in the indirect condenser. In contrast to the direct thermal coupling, the power train coolant circulation and the heating line heat carrier circulation are thermally only indirectly coupled across the refrigerant circulation. No direct heat transfer by means of a heat exchanger from the power train coolant circulation to the heating line heat carrier circulation or conversely is possible.

The heating line heat carrier circulation and the power train coolant circulation are preferably operated with a mixture of water and glycol as heat carrier or coolant.

The concept of the heat flow management system consequently comprises that two coolant circulations are indirectly coupled across a refrigerant circulation. The refrigerant circulation includes the conventional components, such as a refrigerant compressor, an indirect condenser for heating the heat carrier circulation with, for example, a mixture of water and glycol, four expansion elements, a 2/2-way switchover valve and alternatively a coupled valve with the functionality of a switching and an expansion element, an ambient heat exchanger which, in climate control mode operates as condenser and in heat pump operation of the refrigerant circulation operates as evaporator. Furthermore are provided a check valve, a chiller for battery cooling and/or exhaust or lost heat utilization, two evaporators in the climate control units at the front and the back for cooling or drying the interior air, a further check valve, a low pressure-side refrigerant store and drier as well as alternatively an internal heat exchanger optionally for enhancing the cooling efficiency.

The proposed heat flow management system includes a refrigeration circuit connected with two coolant circuits operable independently of one another. The first coolant circuit, also termed heating line heat carrier circulation, is connected with a water-cooled condenser on the high pressure side of the refrigeration circuit. Consequently, the coolant of this circulation is functionally a heat carrier which is reflected in the designation as heat carrier circulation.

The second coolant circuit, also termed power train coolant circulation, is connected with a chiller on the low pressure side of the refrigeration circuit.

At the refrigeration circuit side the heat of condensation can be output in the water-cooled condenser as well as also in the ambient heat exchanger as chiller condenser in the front end, the radiator region of the motor vehicle. In cooling operation the water-cooled indirect condenser can be circumvented with a bypass in order to avoid possible pressure losses through these components. There is an expansion element between the water-cooled indirect condenser and the air-carried ambient heat exchanger in the front end in order to be able to control its operating pressure between high and low pressure. Through this intermediate pressure control either heat can be output under control to the surroundings in chiller operation or be absorbed here under control during heat pump operation. On the low pressure side there are three evaporators, two air-driven evaporators and one chiller in parallel disposition. A bypass around the AC condenser, the ambient heat exchanger, are additionally available.

In the first heat carrier circulation, for example a water-glycol mixture, heat is absorbed and transported to the heat register into the climate control unit, the HVAC, to, lastly, heat the air flowing into the interior.

The second coolant circulation, for example a water-glycol mixture, includes several smaller circuits which can be connected with one another and separated from one another by means of 3/2-way valves. The primary function of this circuit is cooling electric power train components and/or batteries actively through refrigeration circuit cooling or passively through a heat exchanger disposed in the front end as a radiator. During heating operation this circuit is conceptualized for the heat absorption from the electric power train components. This previous power loss is subsequently transported to the chiller in order to provide evaporation heat. Absorbing and incorporating the power loss for the heating of the vehicle increases the performance and efficiency during heating operation.

All expansion elements can optionally also be completely closed such that these can also be employed as stop valves. Changing over between heating and cooling mode can here take place continuously without refrigerant compressor shutdown. A flow reversal in the ambient heat exchanger is not necessary in this system. This leads also to a simplified oil management, since oil traps in the system can be more easily avoided.

Many systems of prior art are either markedly more complex and more expensive or are only optimized to one operating point.

It is preferred for a bypass with a stop valve to be disposed in the refrigerant circulation of the heat flow management device in parallel to the indirect condenser so that in chiller operation of the refrigerant circulation during the cooling of the vehicle cabin or of the components, the indirect condenser can be circumvented across the bypass. The pressure losses in the refrigerant circulation are hereby reduced and the efficiency is enhanced.

In the refrigerant circulation two evaporators are advantageously disposed in parallel connection, wherein a forward evaporator cools the air for the vehicle cabin in a front end climate control unit and a rearward evaporator cools the air in a back end climate control unit.

Associated with each evaporator is preferably one expansion element such that the evaporators can be controlled differently with respect to the evaporation temperature level.

In the refrigerant circulation, furthermore, upstream of the compressor a low-pressure collector for the refrigerant is advantageously disposed.

In the refrigerant circulation preferably an expansion element is furthermore disposed upstream of the ambient heat exchanger such that the ambient heat exchanger is utilizable as evaporator for heat absorption in heat pump mode of the refrigerant circulation.

A bypass with stop valve in the refrigerant circulation parallel to the ambient heat exchanger and its associated expansion element advantageously permits circumventing them.

In the power train coolant circulation advantageously an additional coolant pump is disposed such that within the power train coolant circulation two subcirculations, operable independently of one another, can be connected and implemented.

Parallel to the power train coolant radiator in the power train coolant circulation a bypass is implemented such that in specific operating states no heat is output across the power train coolant radiator to ambient air and, instead, the exhaust or lost heat is kept within the system of the heat flow management device and to utilize it for heating tasks.

In the power train coolant circulation a bypass is advantageously provided that forms a closed subcirculation with the electric motor heat exchanger, the power train coolant radiator and the additional coolant pump.

In the power train coolant circulation a battery cooler is advantageously disposed.

In the power train coolant circulation a further bypass is advantageously disposed in parallel with the battery cooler via which the battery cooler in the circulation can be circumvented.

In the power train coolant circulation advantageously a bypass is disposed parallel to the bypass, via which a subcirculation with the chiller, the battery cooler and the coolant pump can be developed. Providing in parallel two bypasses enables connection configuring and operating the power train coolant circulation in two subcirculations that are operable separately and independently of one another.

It is preferred to dispose in the front climate control unit, apart from the heating heat exchanger, an additional heating facility via which heating of the air for the vehicle cabin can additionally be carried out.

The additional heating facility is herein preferably developed as a Positive Temperature Coefficient (PTC) heating element.

For purposes of control and regulation the heat flow management device is preferably equipped with a control and regulation facility, wherein in the refrigerant circulation following the compressor, the ambient heat exchanger and, following the chiller, in each instance a pressure-temperature sensor is disposed and in the refrigerant circulation following the evaporator a temperature sensor is disposed and in the power train coolant circulation ahead of the coolant pumps and following the chiller in each instance a temperature sensor is disposed and in the air stream following the evaporator, after the heating facility, after the evaporator and before the ambient heat exchanger a temperature sensor is disposed.

An advantageous supplementation of the heat flow management device comprises that in the heating line heat carrier circulation a heat carrier cooling radiator is disposed parallel to the heating heat exchanger across a 3-way valve.

A further advantageous variant of the heat flow management device comprises that in the refrigerant circulation downstream of the compressor a heating condenser is switchably disposed in a looped circuit in series with the ambient heat exchanger that can be blocked using a 3-way valve.

The problem addressed by the invention is furthermore resolved through methods for operating a heat flow management device.

The methods for operating the heat flow management device refer to temperature ranges of the outside temperatures. The temperature ranges as indicated in FIG. 15 start with A indicating the temperature range very cold ambient temperatures of approximately −20° C. to −8° C., over the following temperature range B, cold ambient temperatures up to approximately 5° C., over the temperature range C with low ambient temperatures up to approximately 17° C. up to the temperature range D with mild ambient temperatures up to approximately 30° C., and lastly to the temperature range E that includes high ambient temperatures above 30° C.

The heat flow management device in the temperature range E at high ambient temperatures for cabin and active battery cooling is connection configured such that the power train coolant circulation is operated in two subcirculations, wherein the first subcirculation is connection configured with the chiller, the bypass, the battery cooler and the coolant pump, and the second subcirculation is connection configured with the power train coolant radiator, the coolant pump, the bypass and the electric motor heat exchanger, and the refrigerant circulation is connection configured with the compressor, the bypass with opened stop valve, the ambient heat exchanger and the parallel-connected chiller, forward evaporator and rearward evaporator.

In the temperature range E the heat flow management device at high ambient temperatures is advantageously connection configured for cabin cooling such that the power train coolant circulation with the first subcirculation is formed of the chiller, the bypass, the battery cooler and the coolant pump, and the refrigerant circulation is connection configured with the compressor, the bypass with opened stop valve, the ambient heat exchanger and the parallel-connected forward evaporator and rearward evaporator.

The heat flow management device in the temperature range E at high ambient temperatures for active battery cooling is connected such that the power train coolant circulation is operated in two subcirculations, wherein the first subcirculation is connection configured with the chiller, the bypass, the battery cooler and the coolant pump and the second subcirculation is connection configured with the power train coolant radiator, the coolant pump, the bypass and the electric motor heat exchanger and the refrigerant circulation is connection configured with the compressor, the bypass with opened stop valve, the ambient heat exchanger and the chiller.

The heat flow management device in the temperature range D at mild ambient temperatures for so-called reheat and for passive battery cooling is connection configured such that the power train coolant circulation is connection configured with of the chiller, the electric motor heat exchanger, the power train coolant radiator, the coolant pump, the battery cooler and the coolant pump and the heating line heat carrier circulation is connection configured with the coolant pump, the indirect condenser and the heating heat exchanger and the refrigerant circulation is connection configured with the compressor, the indirect condenser, the ambient heat exchanger and the forward evaporator.

The heat flow management device in the temperature range C at low ambient temperatures for efficient reheat is advantageously connection configured such that the power train coolant circulation is connection configured with the chiller, the electric motor heat exchanger, the bypass, the coolant pump, the battery cooler and the coolant pump and the heating line heat carrier circulation is connection configured with the coolant pump, the indirect condenser and the heating heat exchanger and the refrigerant circulation is connection configured with the compressor, the indirect condenser, the expansion element, the ambient heat exchanger as evaporator for heat absorption and the forward evaporator.

In the temperature range C at low ambient temperatures for efficient reheat and for the simultaneous active battery and power train cooling the power train coolant circulation is connection configured with the chiller, the electric motor heat exchanger, the bypass, the coolant pump, the battery cooler and the coolant pump. The heating line heat carrier circulation is connection configured with the coolant pump, the indirect condenser and the heating heat exchanger and the refrigerant circulation is connection configured with the compressor, the indirect condenser, the expansion element, the ambient heat exchanger as evaporator for heat absorption and the parallel-connected chiller and forward evaporator.

In the temperature ranges A and B at very cold and cold ambient temperatures for cabin heating, the power train coolant circulation is advantageously connection configured with the electric motor heat exchanger, the bypass, the coolant pump and the further bypass. The heating line heat carrier circulation is connection configured with the coolant pump, the indirect condenser and the heating heat exchanger and the refrigerant circulation is connection configured with the compressor, the indirect condenser, the expansion element, the ambient heat exchanger as evaporator for the heat absorption and the chiller.

Again, in the temperature ranges A and B at very cold and cold ambient temperatures, for cabin heating with exhaust or lost heat the power train coolant circulation is advantageously connection configured with the chiller, the electric motor heat exchanger, the bypass, the coolant pump, the further bypass and the coolant pump. The heating line heat carrier circulation is connection configured with the coolant pump, the indirect condenser and the heating heat exchanger, and the refrigerant circulation is connection configured with the compressor, the indirect condenser, the expansion element, the bypass with stop valve, the expansion element and the chiller.

A further advantageous implementation of the operating mode of the heat flow management device in the temperature ranges A and B at very cold and cold ambient temperatures for cabin heating with exhaust or lost heat and ambient heat comprises that the power train coolant circulation is connection configured with the chiller, the electric motor heat exchanger, the bypass, the coolant pump, a further bypass and the coolant pump. The heating line heat carrier circulation is connection configured with the coolant pump, the indirect condenser and the heating heat exchanger, and the refrigerant circulation is connection configured with the compressor, the indirect condenser, the expansion element, the ambient heat exchanger as evaporator for heat absorption, the expansion element and the associated chiller.

In the temperature ranges A and B at very cold and cold ambient temperatures for battery preconditioning with exhaust or lost heat, the power train coolant circulation is connection configured with the chiller, the electric motor heat exchanger, the bypass, the coolant pump, the battery cooler and the coolant pump.

Further details, characteristics and advantages of embodiments of the invention will be evident based on the following description of embodiment examples with reference to the associated drawing.

DETAILED DESCRIPTION

Figure 1:
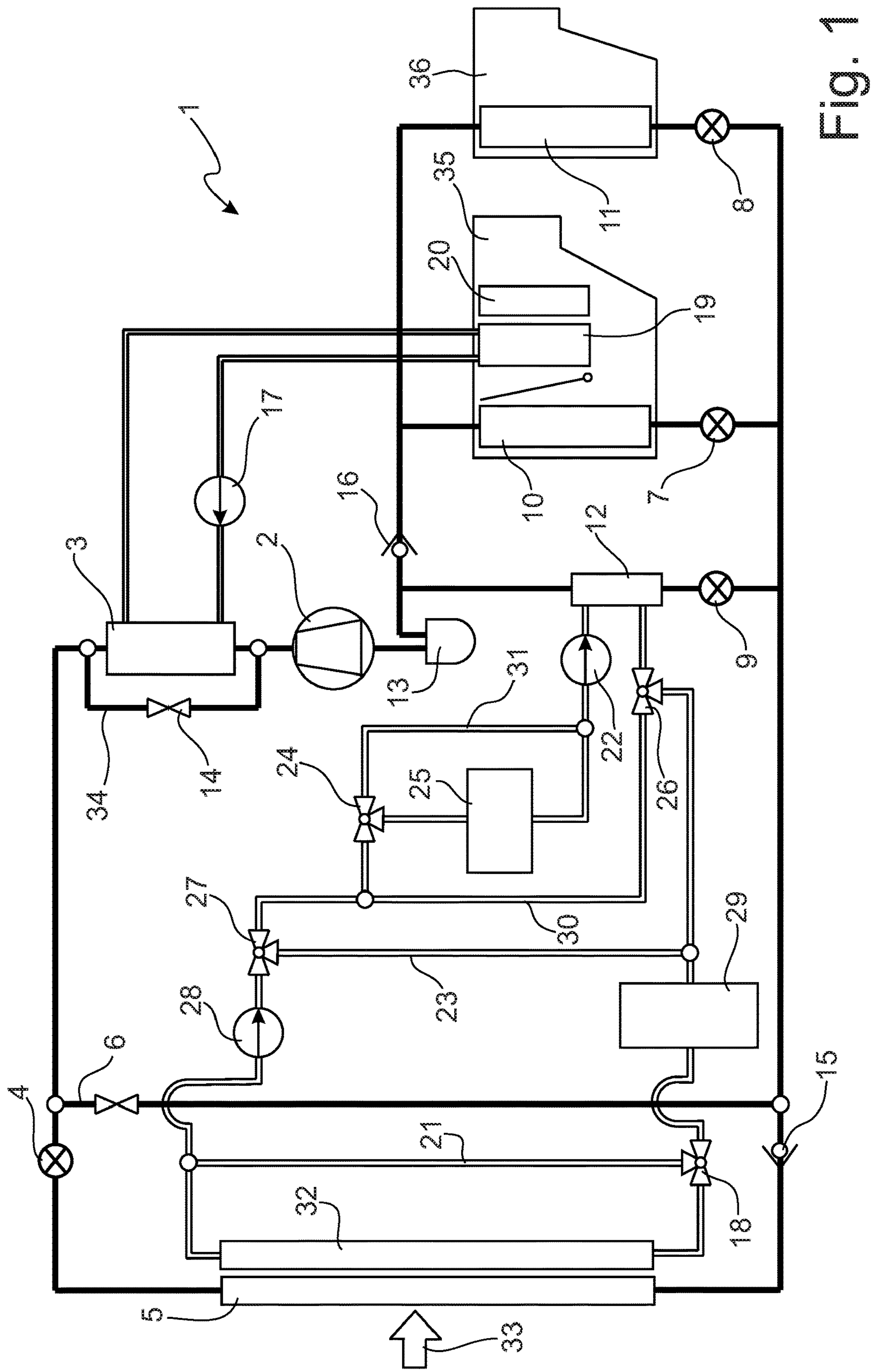
FIG. 1: Diagram of connections heat flow management device.

In FIG. 1 is shown the complete flow chart of the heat flow management device 1 with all circulations, subcirculations and device components. The heat flow management device 1 is substantially comprised of three circulations, thermally coupled with one another, however independently operable, wherein one circulation, in turn, can be divided into two subcirculations, each of which is operable independently and independent of the other.

The heat flow management device 1 comprises a refrigerant circulation that initially comprises the conventional basic components. These are in particular a compressor 2 as well as the ambient heat exchanger 5 as condenser/gas cooler as well as evaporators, the heat exchangers forward evaporator 10 and rearward evaporator 11, each with the associated expansion elements 7 and 8. As additional evaporator in the refrigerant circulation is provided a chiller 12 with the associated expansion element 9 for cooling the second circulation of the power train coolant circulation. In the refrigerant circulation the refrigerant vapor outputs of the parallel-connected evaporators 10, 11, 12 are united, wherein a check valve 16 is disposed between the connection of the refrigerant vapor line from the chiller 12 with the refrigerant vapor lines of the evaporators 10 and 11. The chiller 12 can thereby be operated in the refrigerant circulation alone as evaporator without the refrigerant being able to penetrate into the not-operated evaporators 10 and 11.

On the low pressure side of the system, lastly, a low pressure collector 13 is connected upstream of the compressor 2 before the circulation is complete. As a particularity, the refrigerant circulation comprises an indirect condenser 3 between the compressor 2 and the ambient heat exchanger 5, which however is implemented so as to be bridgeable across a bypass 34 with associated stop valve 14. The indirect condenser 3 heats the second circulation of the heat flow management device 1, the heating line heat carrier circulation, and therewith supplies the heating heat exchanger 19 with heat for heating the air for the vehicle cabin via a front climate control unit 35. In the heating line heat carrier circulation, furthermore, a coolant pump 17 for conveying the heat carrier is additionally provided. As heat carrier serves a water-glycol mixture which simultaneously can also be utilized as a coolant for the power train coolant circulation.

As a particularity in the refrigerant circulation there is furthermore provided a bypass 6 with a stop valve, which bypass is disposed parallel to the ambient heat exchanger 5.

Associated with the ambient heat exchanger 5, and thus connected upstream in the refrigerant flow direction, there is in the refrigerant circulation furthermore an expansion element 4, through which, after the appropriate restriction of the refrigerant in heat pump connection configuration of the refrigerant circulation, the ambient heat exchanger 5 can be utilized as evaporator for absorbing ambient heat from the ambient air 33. The blockable bypass 6 comprises a stop valve and enables operating the refrigerant circulation under circumvention of the ambient heat exchanger 5. To avoid an unintentional refrigerant backflow into the ambient heat exchanger 5 during operation of the refrigerant circulation across the bypass 6, a check valve 15 is accordingly provided.

The evaporators 10 and 11 supply the front climate control unit 35 and the back climate control unit 36 with cold during chiller operation or in reheat operation. The front climate control unit 35 conditions the air for the vehicle cabin in the front region. To this end, the front climate control unit 35 is equipped, in addition to the evaporator 10, also with the heating heat exchanger 19 as well as with an additional heating facility 20 downstream in the direction of air flow. The heating facility 20 is implemented as a high-voltage PTC heater and enables in this manner the energy efficient electrical supplementary heating of the air for the vehicle cabin.

The third circulation of the heat flow management device 1 is the power train coolant circulation which supplies the power train with the electric motor heat exchanger 29 with coolant. Incorporated into the power train coolant circulation is furthermore also the battery cooler 25, which cools or conditions the batteries or accumulators of battery-driven vehicles.

Diverse bypasses 21, 23, 30 as well as 31 are integrated into the power train coolant circulation across 3-way valves 27, 24, 26 and 18. A power train coolant radiator 32 is furthermore provided through which, together with the ambient heat exchanger 5, ambient air 33 flows and which is cooled by the ambient air 33. The power train coolant circulation is switchable into two subcirculations, wherein each subcirculation comprises a coolant pump 28 or 22. The connection configuration variants of the power train coolant circulation will be explained in connection with the description of the various operating modes.

Figure 2:
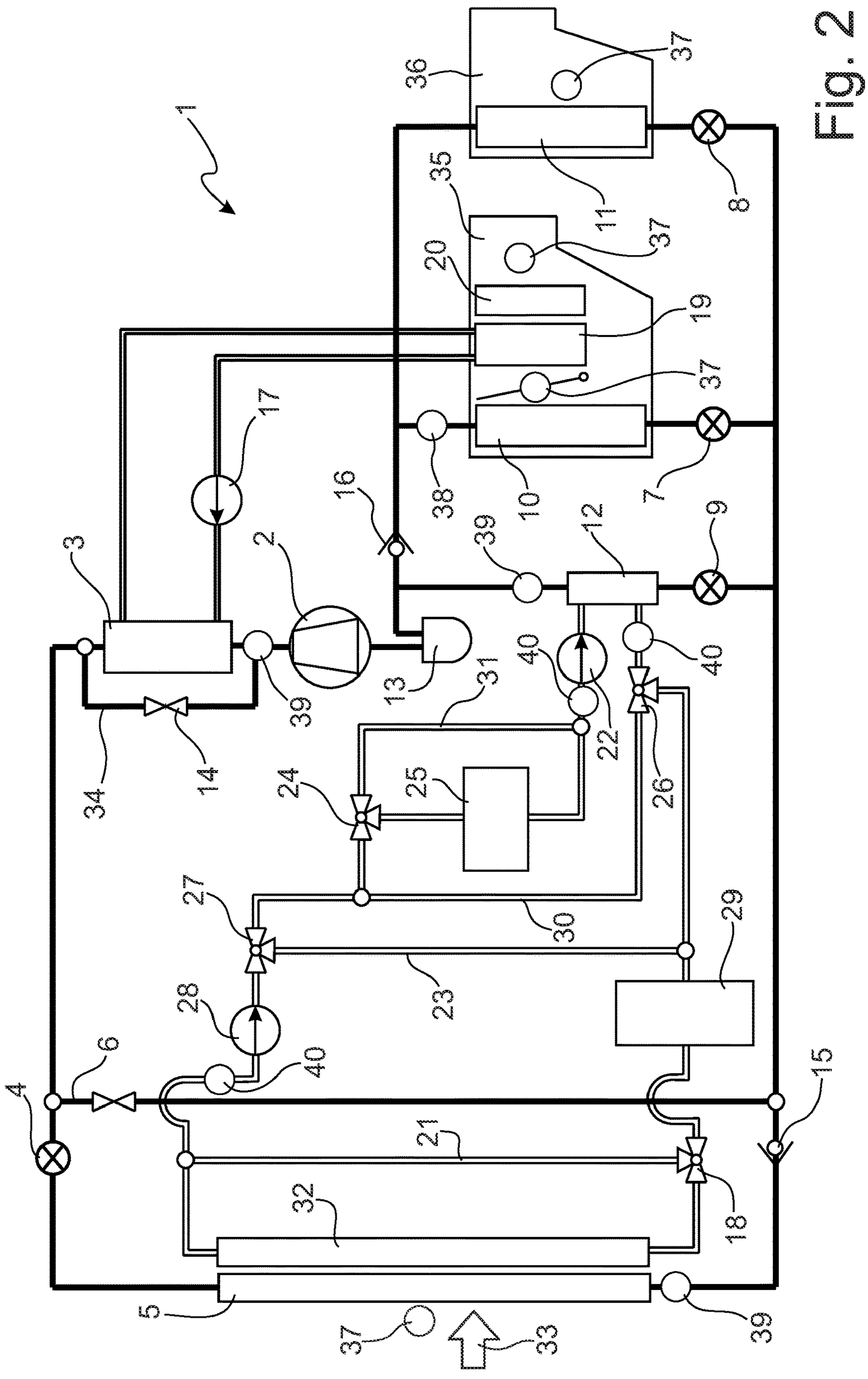
FIG. 2: Diagram of connections heat flow management device with sensors.

The precedingly described diagram of connections of the heat flow management device 1 is supplemented in FIG. 2 by the depiction of sensors for the control and regulation of the heat flow management device 1. In the refrigerant circulation three combined refrigerant pressure and temperature sensors 39 are disposed. A refrigerant pressure and temperature sensor 39 is seated between the compressor 2 and the indirect condenser 3, a further refrigerant pressure and temperature sensor 39 is disposed downstream of the ambient heat exchanger 5 in the refrigerant circulation and a third refrigerant pressure and temperature sensor 39 is disposed downstream of the chiller 12 in the refrigerant circulation. In the refrigerant circulation, furthermore, a refrigerant temperature sensor 38 is disposed downstream of the forward evaporator 10. In the power train coolant circulation three temperature sensors are provided. A coolant temperature sensor 40 is disposed upstream of the coolant pump 28. A further coolant temperature sensor 40 is disposed upstream of the coolant pump 22 and the third coolant temperature sensor 40 is disposed downstream of the chiller 12 in the power train coolant circulation.

Furthermore, four air temperature sensors 37 are placed in the heat flow management device 1. The first air temperature sensor 37 is located, in the direction of flow of the air, downstream of the forward evaporator 10 in the front climate control unit 35, the second air temperature sensor 37 is located at the air output of the front climate control unit 35, the third air temperature sensor 37 is located downstream of the rearward evaporator 11 of the back climate control unit 36 and, lastly, a fourth air temperature sensor 37 is disposed upstream of the entry of the ambient air 33 into the ambient heat exchanger 5.

In the following FIGS. 3 to 12 different operating modes of the heat flow management device 1 are depicted as connection diagrams. To increase the clarity and traceability, the switching states of the expansion elements are herein depicted graphically differentiable. An expansion element in the depiction as full black circle represents a fully closed expansion element, which does not allow refrigerant to pass. An expansion element depicted as a circle with a cross is in restriction position and an expansion element depicted as an empty circle is completely open and without choke function.

The active lines for refrigerant and coolant, or heat carrier fluid, through which there is flow, are also depicted in the operating modes. Active refrigerant lines through which there is flow, are depicted as heavy full lines. Heat carrier lines of the heating line heat carrier circulation through which there is flow are depicted in double lines with narrow spacing between them and active coolant lines of the power train coolant circulation with throughflow are depicted in double lines with wide spacing between them. Inactive lines through which there is no throughflow in the particular operating mode are depicted in thin full lines.

Figure 3:
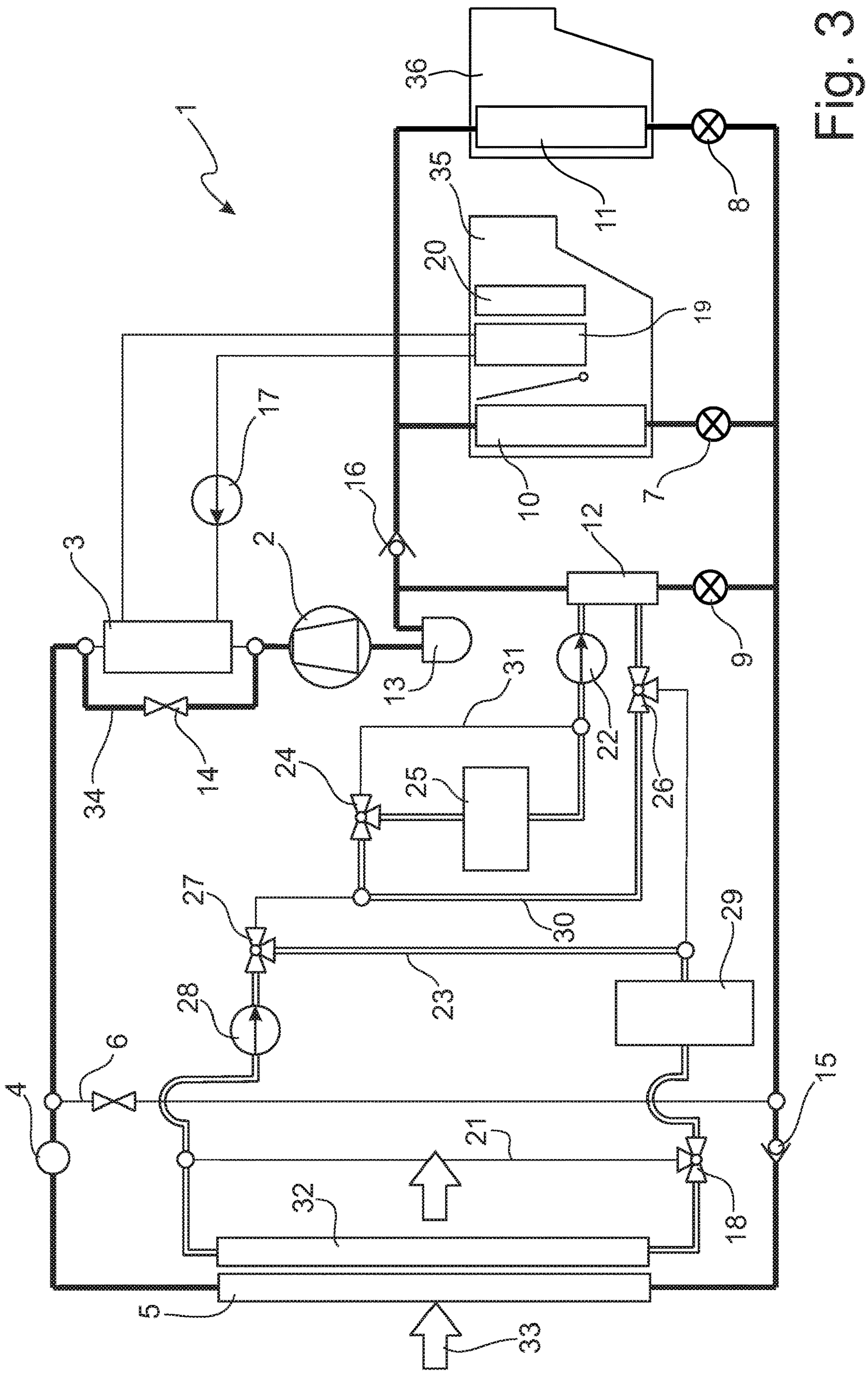
FIG. 3: Connection configuration in vehicle cabin and active battery cooling.
Figure 15:
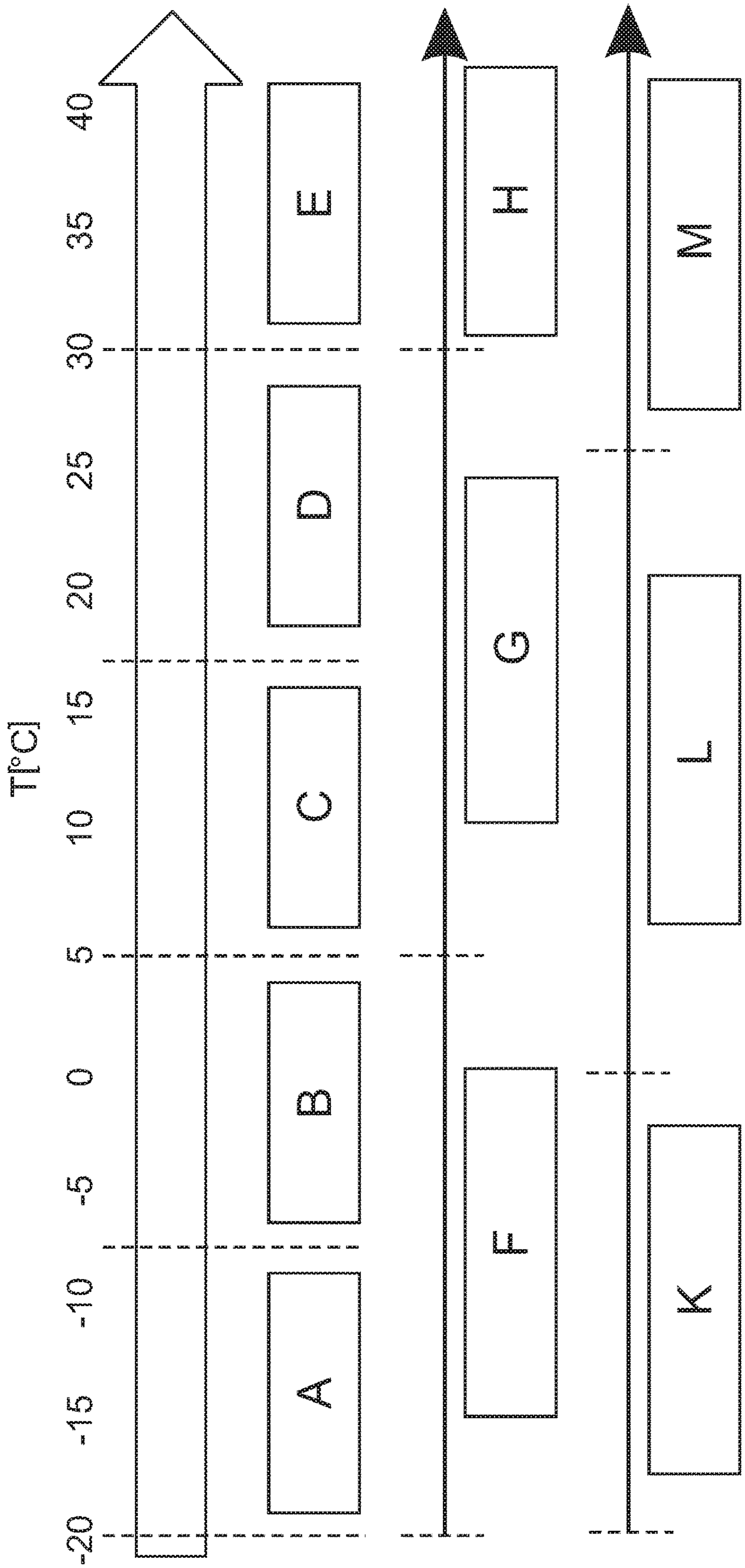
FIG. 15: Diagram of temperature ranges and operating modes.

FIG. 3 depicts the connection configuration of the heat flow management device 1 during vehicle cabin and active battery cooling. This mode is active when the ambient temperatures according to the temperature range E are above 30 degrees Celsius. An overview of the temperature ranges and operating modes is depicted in FIG. 15. In the operating mode ‘vehicle cabin and active battery cooling’ the heating line heat carrier circulation of the heat flow management device 1 is not operated such that the refrigerant circulation in bypass 34 with the stop valve 14 open, under circumvention of the indirect condenser 3 is connection configured downstream of the compressor 2. The refrigerant gas flows from the compressor 2 across the bypass 34 through the completely opened expansion element 4 to the ambient heat exchanger 5 and here condenses through the cooling with ambient air 33. The liquid hot refrigerant is routed via the check valve 15 to the three parallel-connected heat exchangers 10, 11, 12, operating as evaporators, wherein the forward evaporator 10 with associated expansion element 7 cools the vehicle cabin in the front region in the front climate control unit 35 and the rearward evaporator 11 with associated expansion element 8 cools the air in the back climate control unit 36. The chiller 12 with associated expansion element 9 cools the coolant in the first subcirculation of the power train coolant circulation with the battery cooler 25. According to the depicted operating mode, the power train coolant circulation is divided into two subcirculations. The first subcirculation, the battery cooling circulation, is connection configured with the chiller 12, the 3-way valve 26 toward the bypass 30 across the 3-way valve 24 to the battery cooler 25 and across the coolant pump 22 back to the chiller 12. The second subcirculation of the power train coolant circulation, the motor cooling circulation, extends, starting from the coolant pump 28 across the 3-way valve 27 through the bypass 23 to the electric motor heat exchanger 29 across the 3-way valve 18 and across the power train coolant radiator 32 back to the coolant pump 28. In the power train coolant radiator 32 the exhaust or lost heat of the power train, that had been absorbed in the electric motor heat exchanger 29 by the coolant circulation, is output to the ambient air 33. The electric motor heat exchanger 29 is representative of the components to be cooled across this coolant circulation, such as the electric motor the power electronics or the DC-DC charger.

After the evaporation of the refrigerant in evaporators 10, 11, 12, the refrigerant circulation is complete across the low pressure collector 13 to the compressor 2.

This operating mode is advantageous in order to cool, in addition to cooling the active climate control of the vehicle cabin, by means of the refrigerant circulation connection configured as chiller, the battery parallel to the vehicle cabin, also actively with the chiller. The power train, on the other hand, is not cooled by the refrigerant circulation in chiller connection configuration but rather exclusively passively by the ambient air 33.

Figure 4:
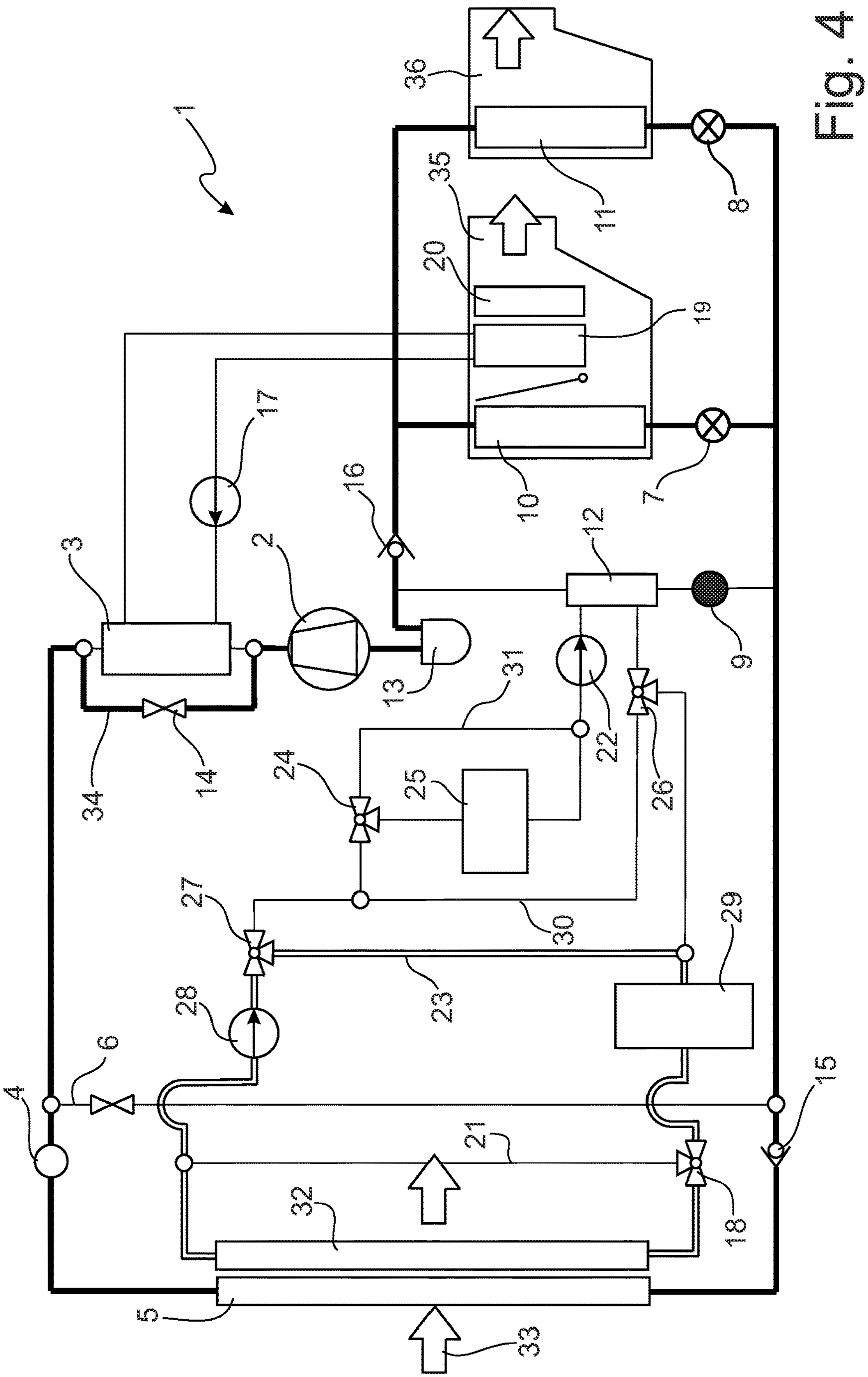
FIG. 4: Connection configuration in vehicle cabin cooling.

FIG. 4 shows the connection configuration in vehicle cooling and optionally connection configured additional air cooling of the second subcirculation of the power train coolant circulation. This mode is alternatively connection configured if the ambient temperatures according to temperature range E are above 30 degrees Celsius.

The refrigerant circulation is connection configured similarly to the mode described precedingly. Only the third evaporator, the chiller 12, is not supplied with refrigerant due to the completely closed expansion element 9. The entire first subcirculation of the power train coolant circulation is not operated. The second subcirculation, however, in this mode also does not output the lost heat of the power train from the electric motor heat exchanger 29 across the 3-way valve 18 and across the power train coolant radiator 32 to the ambient air 33.

The mode described here corresponds to that of a classic vehicle climate control system. The air to be supplied to the interior of the vehicle, which can also include portions of ambient air, is cooled down and dried in order to lower the interior volume temperature of the vehicle.

In cabin cooling mode only the interior volume evaporators 10 and 11 are supplied with refrigerant. Herein, depending on the requirements, the expansion element upstream of the evaporator ensures the pressure relief of the refrigerant and the required mass flow delimitation.

Figure 5:
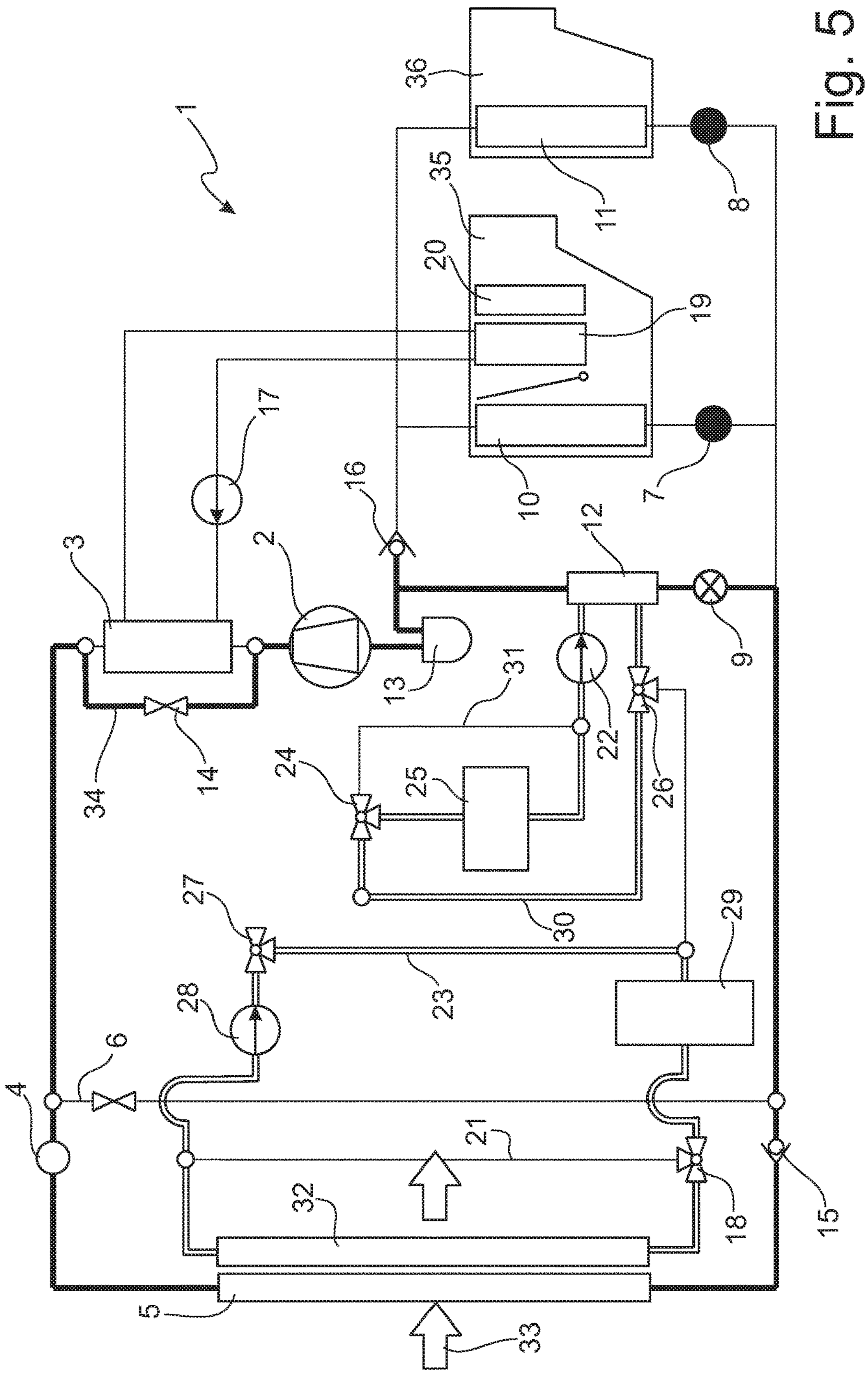
FIG. 5: Connection configuration in active battery cooling.

In FIG. 5 is shown the active battery cooling mode. In this operating mode both evaporators 10 and 11 are blocked from the refrigerant circulation through the completely closed expansion elements 7 and 8 such that the liquid refrigerant is completely pressure-relieved across the expansion element 9 and evaporated in the chiller 12. Consequently, the maximal active cooling capacity of the refrigerant circulation is available for cooling the battery by means of the battery cooler 25 in the first subcirculation of the power train coolant circulation. Parallel to this first part is also connection configured the second subcirculation of the power train coolant circulation, and the exhaust or lost heat of the power train is output across the power train coolant radiator 32 to the ambient air 33 via ambient heat exchanger 5. Vehicle cabin cooling is omitted especially in critical situations with respect to the battery temperature in order to ensure, for example maximal efficiency of the battery utilization and to continue ensuring the protection of the battery in critical thermal situations. This mode is applied for example during charging operation of the system at the charging column.

Figure 6:
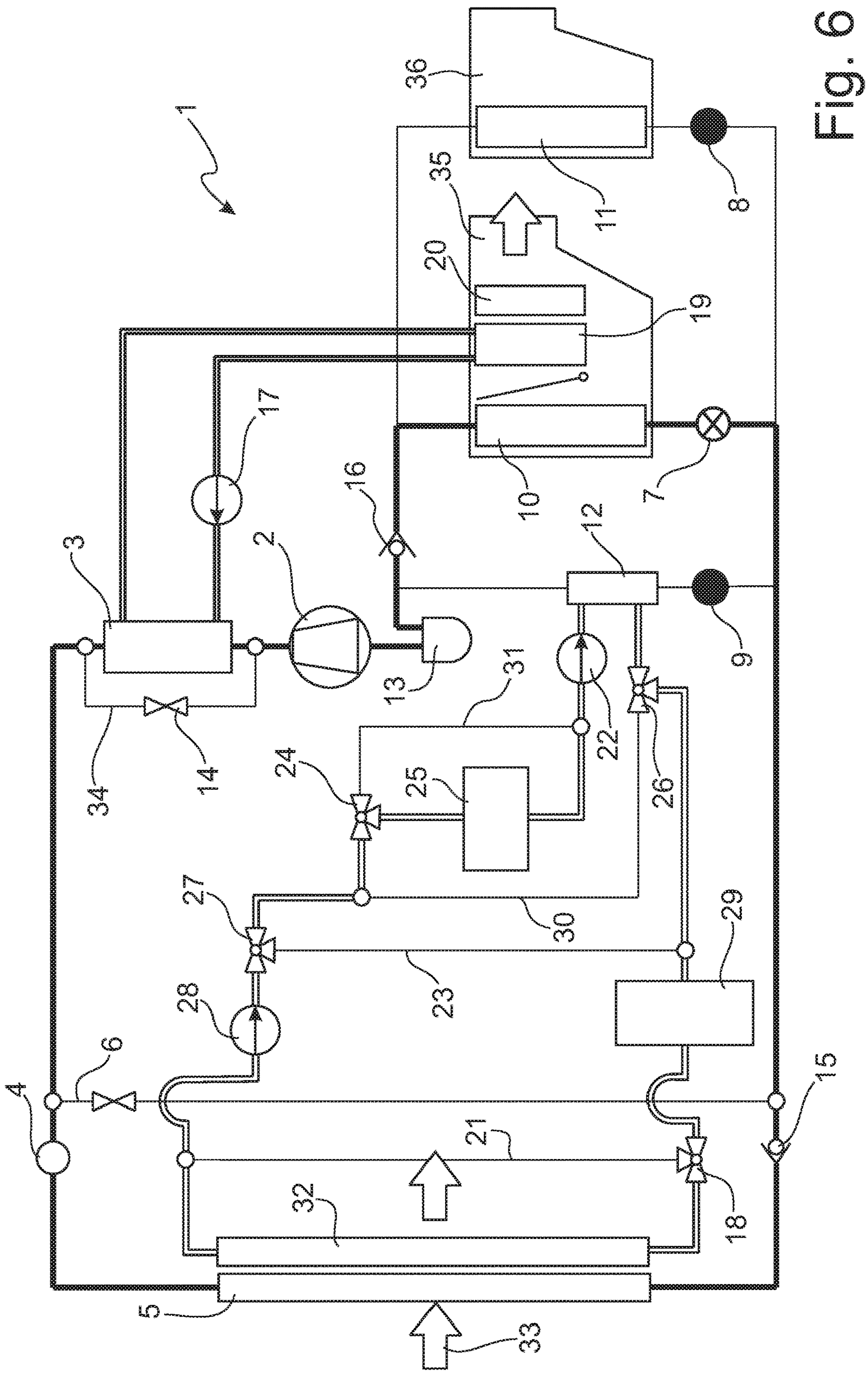
FIG. 6: Connection configuration in reheat and passive battery cooling.

FIG. 6 shows the connection configuration of the heat flow management device 1 in reheat and passive battery cooling operating mode. By reheat mode is understood that the air that is routed into the vehicle cabin across the front climate control unit 35, is first cooled and dehumidified in the forward evaporator 10 and is subsequently heated in the heating heat exchanger 19 to the desired outlet temperature from the front climate control unit 35. This mode is required at mild ambient temperatures in the temperature range D in order to avoid, for example, fogging of the windshield in certain situations. The temperature range D extends from approximately 17 to 30 degrees Celsius. The heat flow management device 1 is subsequently operated with the refrigerant circulation such that the refrigerant, after the compression in compressor 2, flows through the indirect condenser 3 where, first, deheating after the compression of the refrigerant takes place. The stop valve 14 is herein closed and the bypass 24 is inactive. The heat at relatively high temperature is transferred in the indirect condenser 3 to the heating line heat carrier circulation and the heat carrier, a mixture of glycol and water, is conveyed by means of the coolant pump 17 across the indirect condenser 3 to the heating heat exchanger 19 where the vehicle cabin air, after the cooling and dehumidification in the forward evaporator 10, is subsequently raised to the appropriate desired temperature in the front climate control unit 35. The battery and the power train coolant circulation are carried in the power train coolant circulation across the chiller 12 which however is not integrated into the refrigerant circulation and which consequently does not absorb any heat. The coolant is transported from chiller 12 through the 3-way valve 26 across the electric motor heat exchanger 29 through the 3-way valve 18 to the electric motor coolant radiator 32 where the lost heat of the battery and of the power train are output to the ambient air 33. From the power train coolant radiator 32 the coolant flows across the coolant pump 28 across the 3-way valves 27, 24 and the battery cooler 25 as well as the coolant pump 22 further to the chiller 12, where the circulation is complete.

In the operating mode depicted in FIG. 6 the refrigerant circulation supplies only the forward evaporator 10 with liquid refrigerant, the rearward evaporator 11 for the back climate control unit 36 and the chiller 12 are excluded from the refrigerant circulation through the closed expansion elements 9 and 8.

The heat absorbed in the air drying process through the evaporation of the refrigerant is utilized again through the condensation in the internal condenser 3 in order to heat the air again to the target temperature.

Depending on the outside temperature, herein the pressure level of the ambient heat exchanger 5 disposed in the front end of the vehicle can be controlled. Components of the electric power train as well as the traction battery are passively cooled by the coolant circuit and power train coolant radiator 32.

Figure 7:
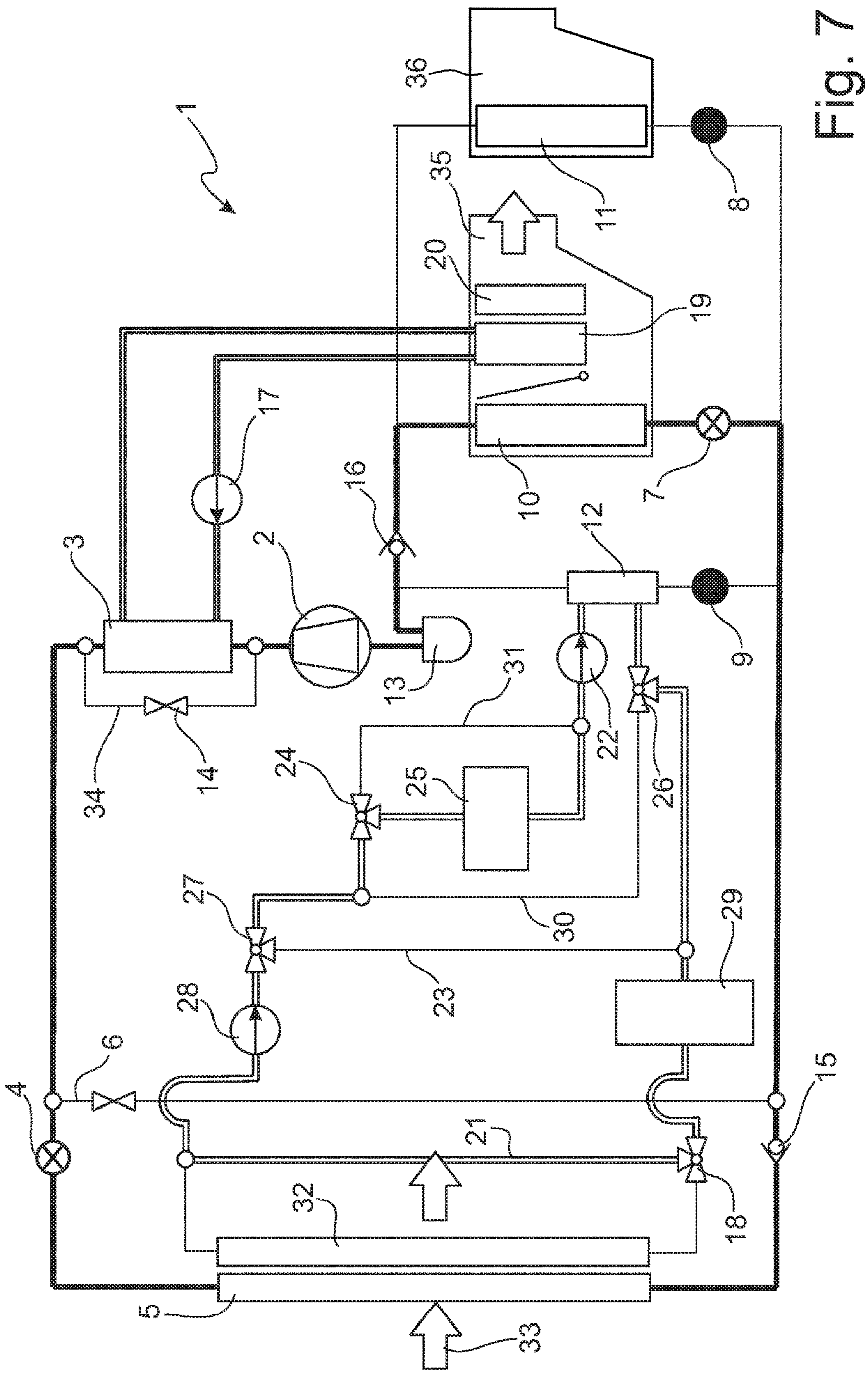
FIG. 7: Connection configuration in efficient reheat and single heat source.

FIG. 7 shows the connection configuration of the heat flow management device 1 in the mode during efficient reheat with a single heat source. The refrigerant circulation is herein depicted with the compressor 2, the indirect condenser 3 as well as the expansion element 4 with restriction/choke function. The ambient heat exchanger 5, after preceding restriction of the refrigerant, operates as evaporator in heat pump mode of the refrigerant circuit and absorbs from the ambient air 33 ambient heat for the evaporation of the refrigerant. The refrigerant is conveyed to the forward evaporator 10 and prior to that is again restricted in the expansion element 7. Consequently, the forward evaporator 10 substantially dehumidifies the air in the front climate control unit 35 which subsequently is heated in the heating heat exchanger 19 to the particular required outlet temperature. The refrigerant vapor from the forward evaporator 10 is supplied to the compressor 2 across the low pressure collector 13 and the refrigerant circulation is complete. The condensation of the refrigerant takes place in the indirect condenser 3 and the heat of condensation is routed in the heating line heat carrier circulation by means of the coolant pump 17 to the heating heat exchanger 19 where, as described, the air flow of the front climate control unit 35 is appropriately heated therewith. The depicted connection configuration is applied in the temperature range C at low ambient temperatures between 5 and 17 degrees Celsius. The power train coolant circulation is herein operated without further external heat source. The coolant circulates through the electric motor heat exchanger 29 across the 3-way valve 18 and the bypass 21, the coolant pump 28, the 3-way valves 27, 24 and across the battery cooler 25 as well as the coolant pump 22 and the chiller 12 to the electric motor heat exchanger 29. In this mode there is no refrigerant flow through the chiller 12. The exhaust or lost heat of the power train is consequently utilized for heating the battery without inclusion of any additional heat source.

In FIG. 7, in contrast to the mode according to FIG. 6, the ambient heat exchanger 5 is operated as heat source in a range between intermediate pressure and low pressure in order to be able to absorb the requisite energy.

Figure 8:
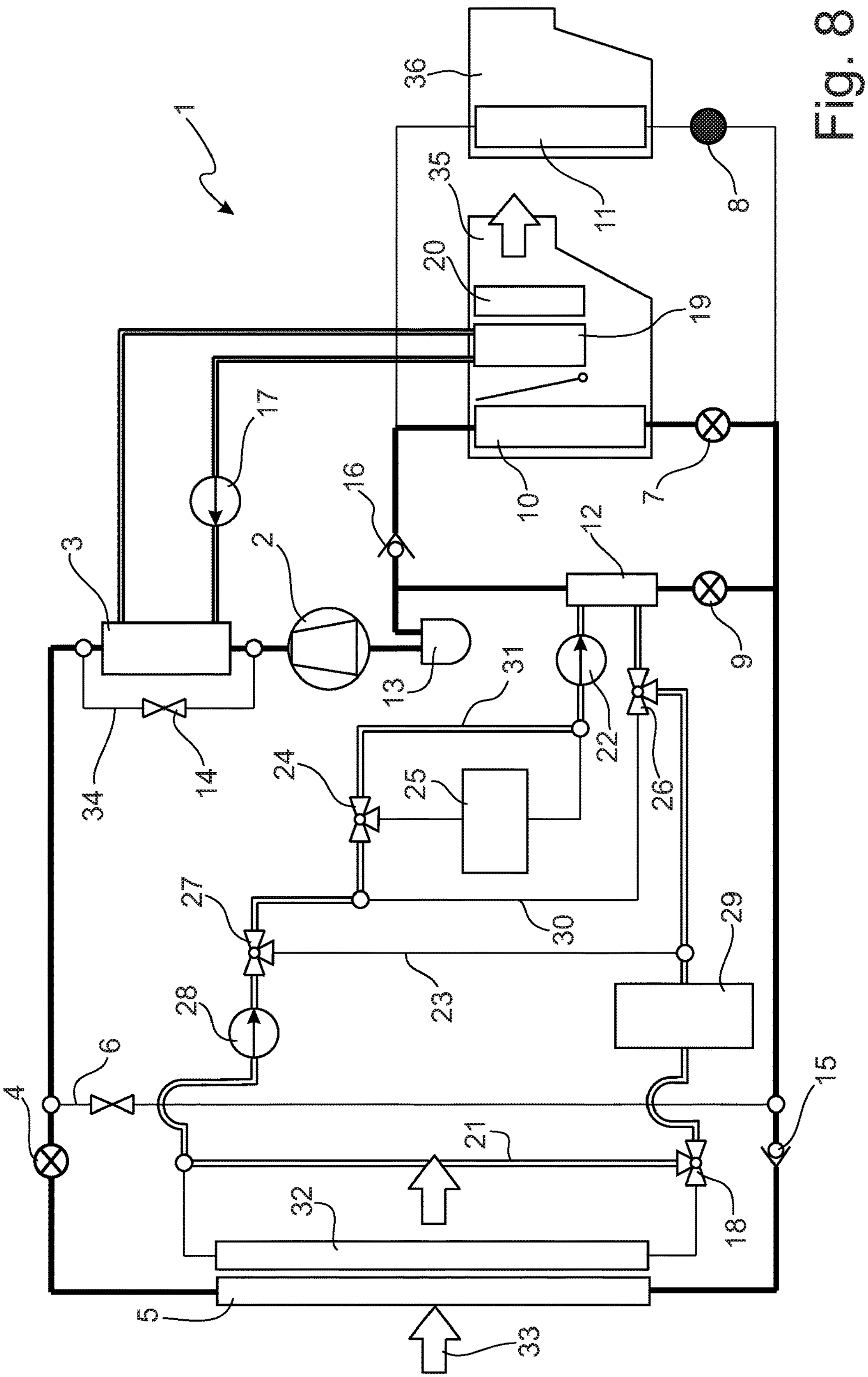
FIG. 8: Connection configuration in efficient reheat and dual heat source.

FIG. 8 depicts a connection configuration during efficient reheat and with dual heat source. This mode is applied in the temperature range C at low ambient temperatures. In contrast to the mode according to FIG. 7, in the power train coolant circulation the battery cooler 25 is not operated and there is no flow through it, whereas, however, the chiller is operated as evaporator by opening the expansion element 9. Consequently, the power train is actively cooled across the electric motor heat exchanger 29 and the heat absorbed by the refrigerant circulation can be absorbed by the heating line heat carrier circulation across the indirect condenser 3 and be output to the air for heating the cabin across the heating heat exchanger 19.

In contrast to the mode according to FIG. 7 described precedingly, the power train coolant circulation is connection configured such that, in addition to the ambient heat, the lost heat of the electronic components, such as for example of the electric motor, the power electronics and of the DC-DC charger, can also be utilized for heating the vehicle cabin.

This heat pump mode is highly efficient and, due to its low power consumption, increases the range of the electrically driven vehicle (EV HEV PHEV).

Figure 9:
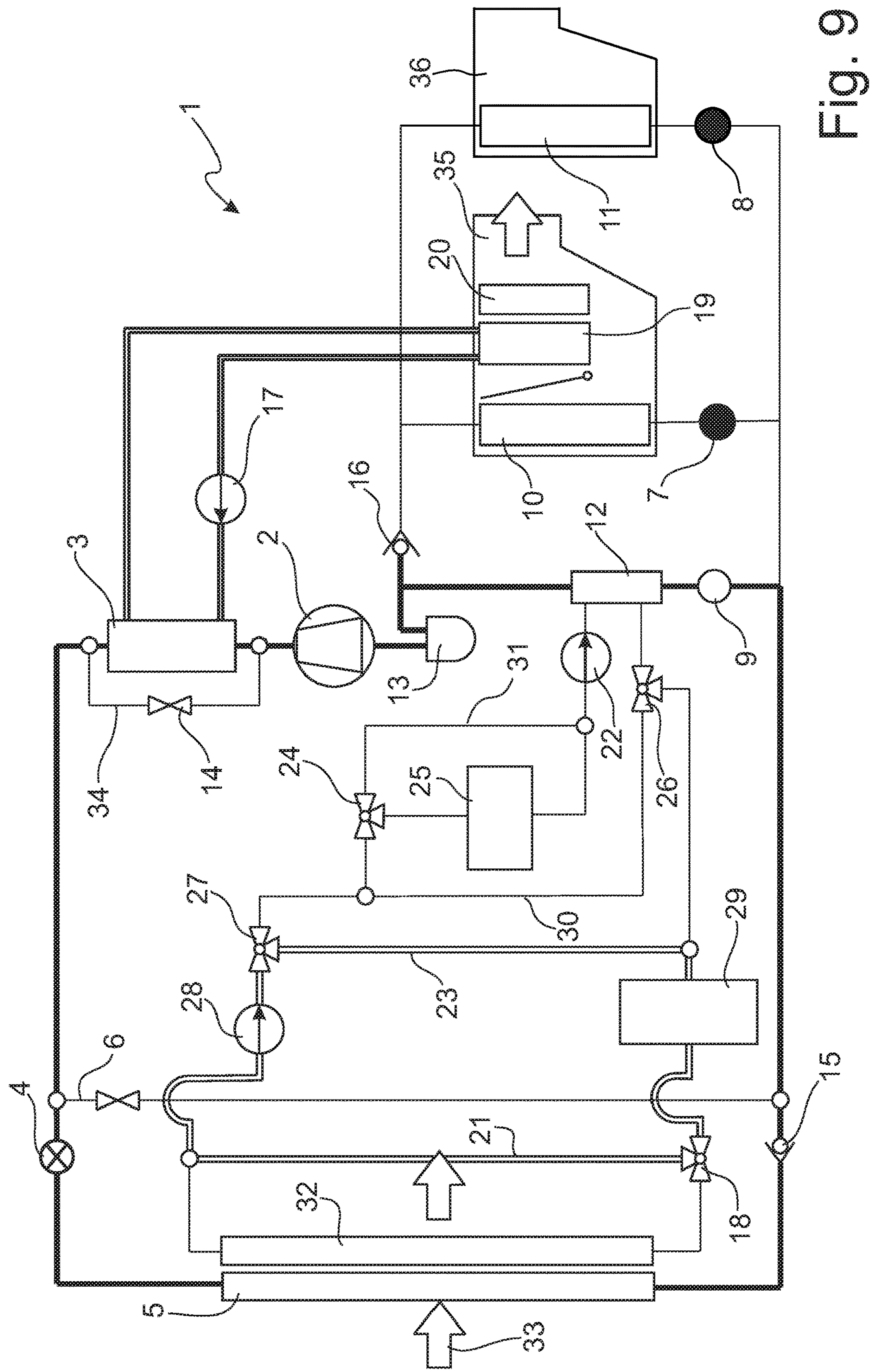
FIG. 9: Connection configuration in vehicle cabin heating and ambient heat source.

FIG. 9 shows the connection configuration of the heat flow management device 1 in vehicle cabin heating in heat pump mode with utilization of ambient heat, which is preferably employed at low and very low ambient temperatures in the temperature ranges A and B between minus 20 degrees Celsius and plus 5 degrees Celsius. The second subcirculation of the power train coolant circulation including the electric motor heat exchanger 29, the bypass 21, the coolant pump 28 and the bypass 23 is connection configured such that no additional heat source is applied for tempering the power train. The refrigerant circulation comprises the compressor 2, the indirect condenser 3 for the condensation of the refrigerant and heat out-coupling as well as the expansion element 4 in restriction position. The liquid pressure-relieved refrigerant is conveyed into the ambient heat exchanger 5 which correspondly operates as evaporator in heat pump connection configuration of the refrigerant circulation at the stated employment conditions. In this mode the evaporators 10, 11 of the refrigerant circulation in the front climate control unit 25 and in the back climate control unit 36 are not supplied with refrigerant. There is unrestricted flow through the chiller 12 t such that in this connection configuration heat is exclusively absorbed from the ambient air 33 in the ambient heat exchanger 5. The restriction and the complete evaporation of the refrigerant take place in the expansion element 4 and in the ambient heat exchanger 5.

The mode described in the preceding corresponds to heat pump mode. The air blown into the interior of the vehicle is not cooled down and is not dried. Instead, the heating heat exchanger 19 heats the interior air. To provide the heat for this purpose, the compressor 2 compresses gaseous refrigerant to a high-pressure level. This high-pressure refrigerant is conveyed through the indirect condenser 3 which functions as a refrigerant condenser and provides a warm glycol-water mixture. In the front climate control unit 35 the temperature louver frees a routing path for the air through the heating heat exchanger 19. The refrigerant condenses to high-pressure level and herein outputs heat to the heating line heat carrier circulation. The liquified refrigerant subsequently is conveyed at high-pressure level to the expansion element 4 that is set depending on operating mode and requirement. From here it is routed at low-pressure level to the ambient heat exchanger 5. The refrigerant is now changed from the liquid to the gaseous phase by means of evaporation without direction reversal of the refrigerant circulation. Heat is completely absorbed from the environment. The refrigerant is now routed across the check valve 15 to the further components.

Depending on the outside temperature conditions or air temperatures in the interior or the cooling requirements of the electric components, now the succeeding expansion elements 7, 8, 9 can distribute the mass flow onto the further evaporators 10, 11 or the chiller 12.

In the specific mode according to FIG. 9 the refrigerant is only conveyed through the chiller 12, which however, in turn, is blocked at the water-glycol side and has no throughflow. Consequently, the chiller functions here only as a pipeline without evaporator function. The refrigerant is subsequently conveyed to the low-pressure collector 13 and from here into the compressor 2.

The stop valve 16 acts to prevent a possible refrigerant migration into the evaporators 10, 11.

The heat pump mode is highly efficient and increases the purely electrical range of the vehicle (EV HEV PHEV). A heating facility 20, implemented as a high-voltage heater HV PTC still further supports heating the air in the climate control unit.

Figure 10:
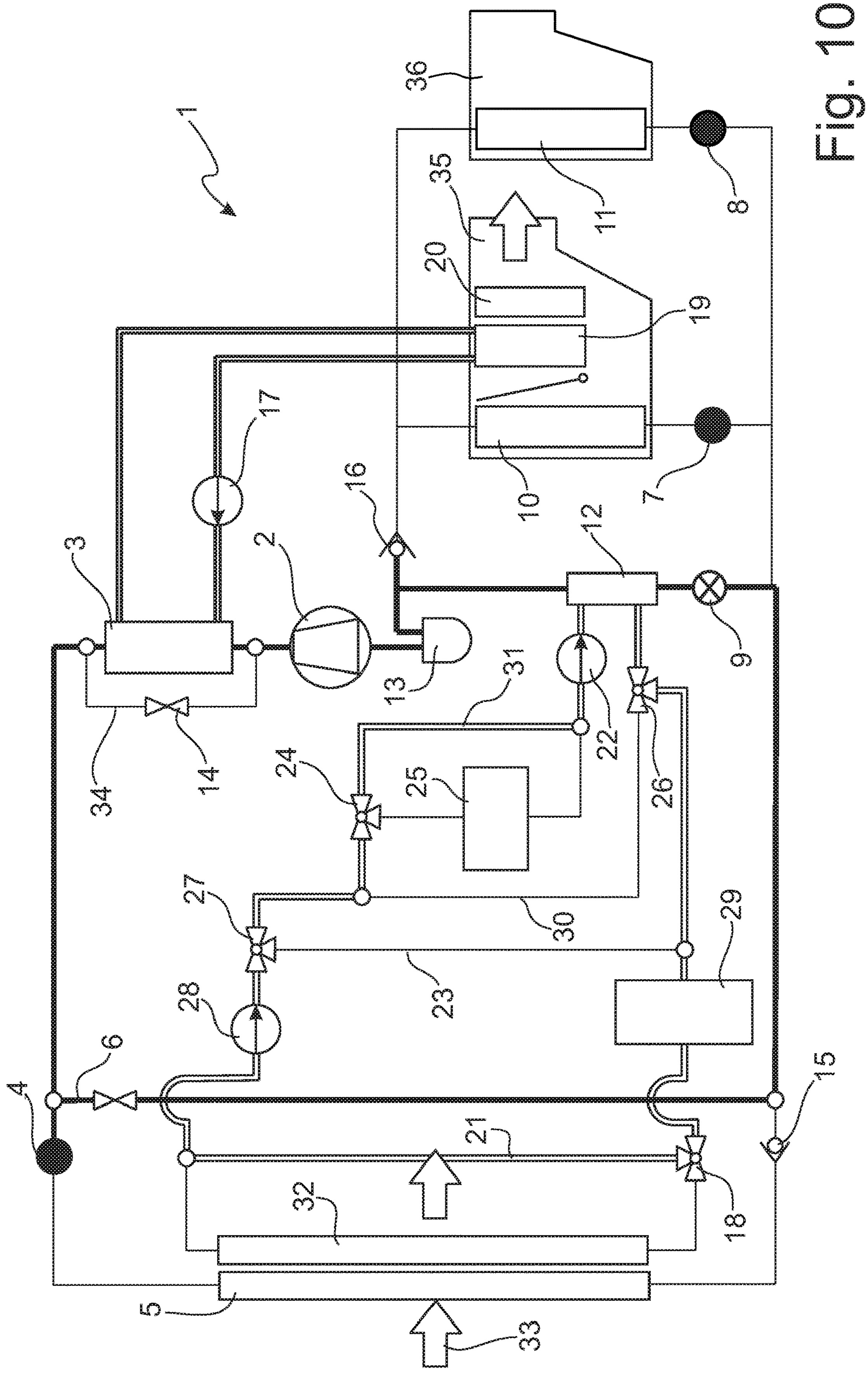
FIG. 10: Connection configuration in vehicle cabin heating and exhaust or lost heat source

FIG. 10 shows the connection configuration in vehicle cabin heating utilizing the exhaust or lost heat, again at very cold and cold ambient temperatures between minus 20 degrees Celsius and 5 degrees Celsius.

The refrigerant circulation is connection configured with the compressor 2 across the indirect condenser 3, with the expansion element 4 closed, across the bypass 6 with stop valve with the restriction through the expansion element 9 and evaporation in the chiller 12 as well as accumulation in the low-pressure collector 13. The heating line heat carrier circulation utilizes the heat of condensation from the indirect condenser 3, wherein the heat carrier is transported by means of the coolant pump 17 to the heating heat exchanger 19. The evaporators 10, 11 of the climate control units 35, 36 are not active since the air is also sufficiently dry in this temperature range. The power train coolant circulation cools the power train via the electric motor heat exchanger 29. The circulation to the chiller 12 across the bypass 21, the coolant pump 28 as well as the bypass 31 and the coolant pump 22 is closed and the exhaust or lost heat of the power train is output across the chiller 12 to the indirect condenser 3 to the heating line heat carrier circulation.

In contrast to the previous mode according to FIG. 9, no ambient heat is here absorbed but the chiller 12 alone is utilized as evaporator for the heat absorption for the refrigerant circulation. The lost heat from the electric power train is herein sufficient to realize the heating comfort in the interior.

Figure 11:
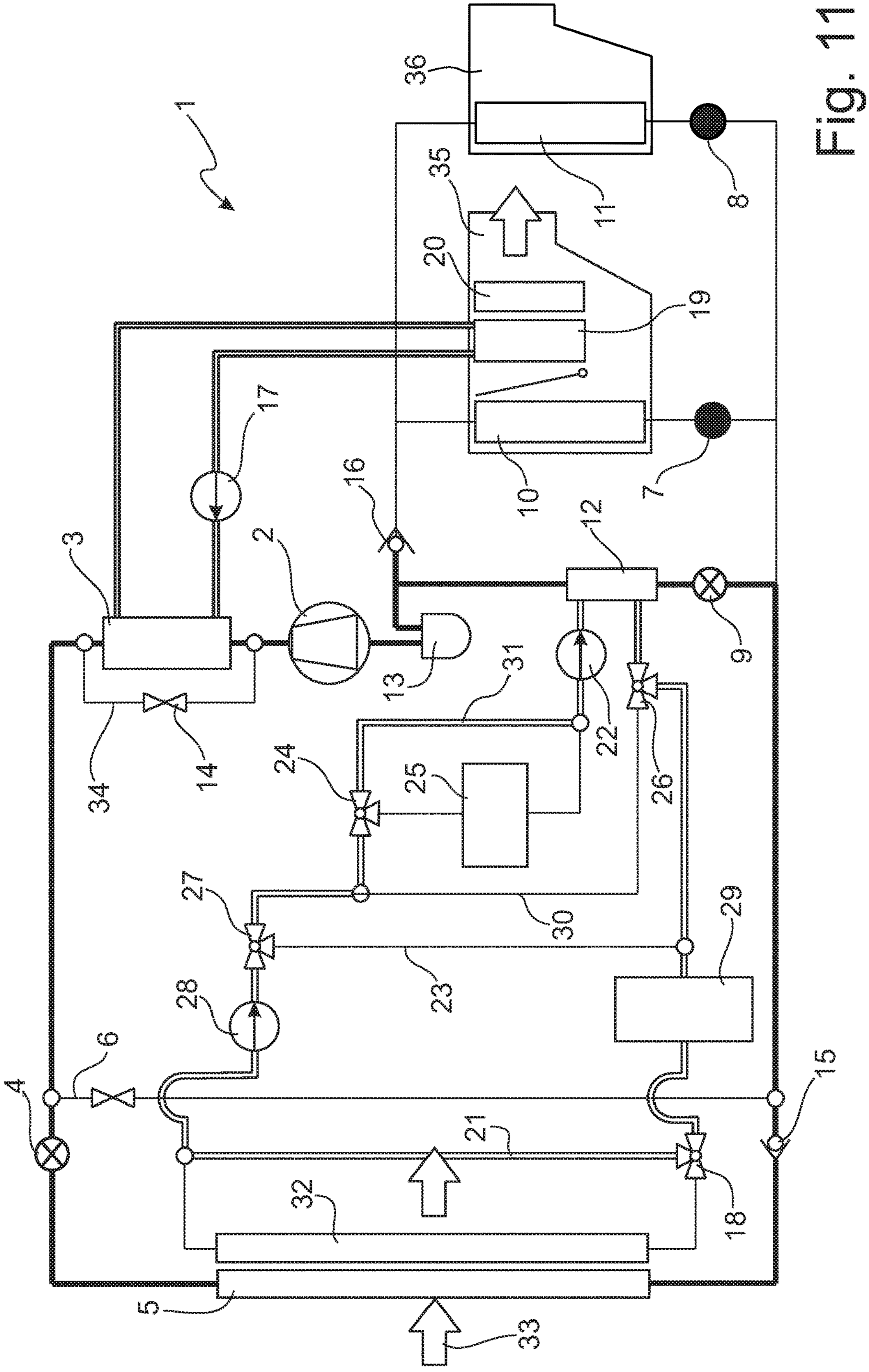
FIG. 11: Connection configuration in vehicle cabin heating and ambient heat source as well as exhaust or lost heat source.

FIG. 11 shows the connection configuration of the heat flow management device 1 during vehicle cabin heating utilizing the ambient heat as well as the exhaust or lost heat of the power train. In this operating mode at very cold and cold ambient temperatures between minus 20 degrees Celsius and 5 degrees Celsius in the temperature ranges A and B, after the compression of the refrigerant vapor in compressor 2, the condensation in the indirect condenser 3 and restriction of the refrigerant in the expansion element 4, the ambient heat exchanger 5 is utilized as evaporator for the energy absorption from ambient air 33. In the further course of the refrigerant circulation the chiller 12 is also utilized, after restriction of the refrigerant in the expansion element 9, as evaporator for the heat absorption of the exhaust or lost heat from the power train. The power train coolant circulation is operated across the chiller 12, the electric motor heat exchanger 29 as well as across bypass 21 and the coolant pump 28 and bypass 31 toward the chiller 12.

In contrast to the mode according to FIG. 10, now the ambient heat from the ambient heat exchanger 5 as well as also across chiller 12, exhaust or lost heat from the electric power train is removed. In this mode the battery is not cooled.

Figure 12:
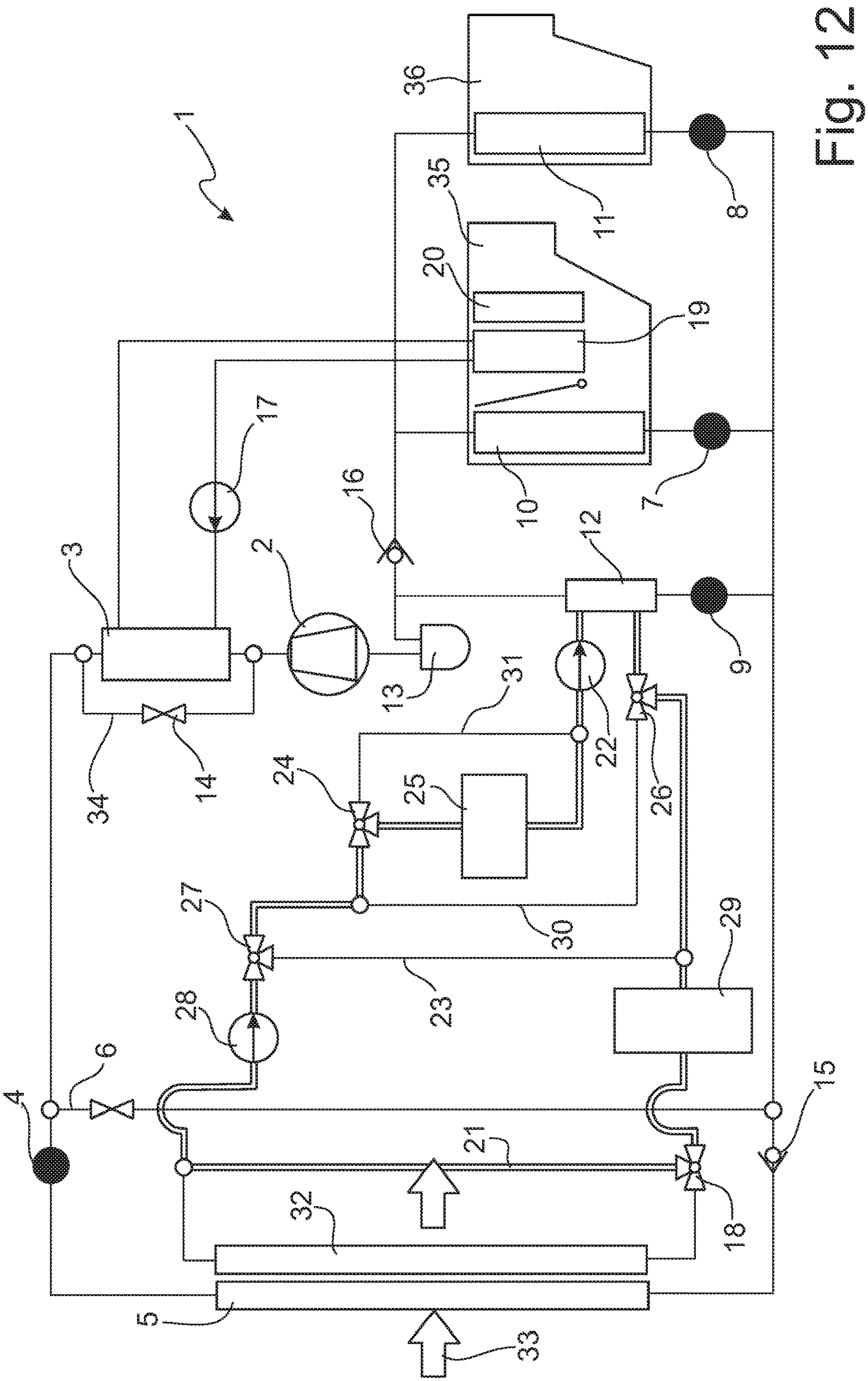
FIG. 12: Connection configuration in battery conditioning with exhaust or lost heat source.

FIG. 12 shows the connection configuration of the heat flow management device 1 during battery conditioning by means of the exhaust or lost heat from the power train in the application at very cold to cold ambient temperatures according to the temperature ranges A and B between minus 20 degrees Celsius and 5 degrees Celsius. The refrigerant circulation and also the heating line heat carrier circulation are not operated. Only the power train coolant circulation is operated in closed circulation from the electric motor heat exchanger 29 across bypass 21, the coolant pump 28 and the battery cooler 25 as well as the coolant pump 22 and the chiller 12. However, since the refrigerant circulation is not being operated, the chiller 12 does not cool the power train coolant circulation in this operating mode but experiences only passive throughflow without heat transfer.

The depicted mode serves for battery preconditioning, in this case for battery preheating, for example at standstill during battery charging. Electric energy is converted into heat in a heating facility within the power train and transferred to the traction battery by means of the power train coolant circulation.

This mode serves neither for heating the interior air nor for cooling it.

Should in one of the precedingly described modes, due to an error function or due to overload of the heating mode, the ambient heat exchanger 5 superficially ice over, the entire system loses heating capacity. To reverse this, the refrigerant circulation can temporarily be operated in thaw mode. In spite of heating requirements in the interior, the ambient heat exchanger 5 is herein, brought to a high pressure level. By means of condensation of the refrigerant in the ambient heat exchanger 5 sufficient heat is output to the ambient heat exchanger 5 that the externally formed ice layer is thawed.

Figure 13:
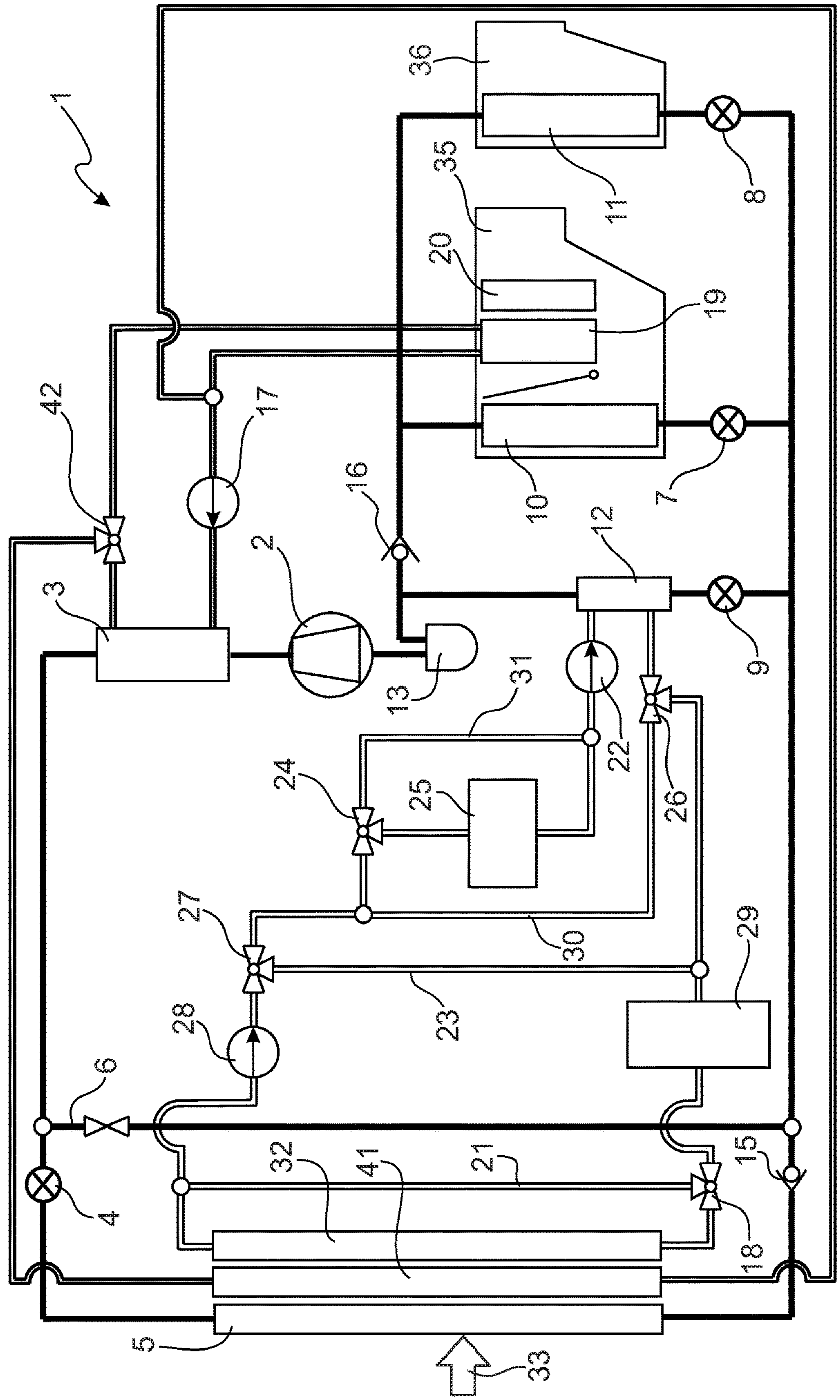
FIG. 13: Diagram of connections with expanded radiator capacity.
Figure 14:
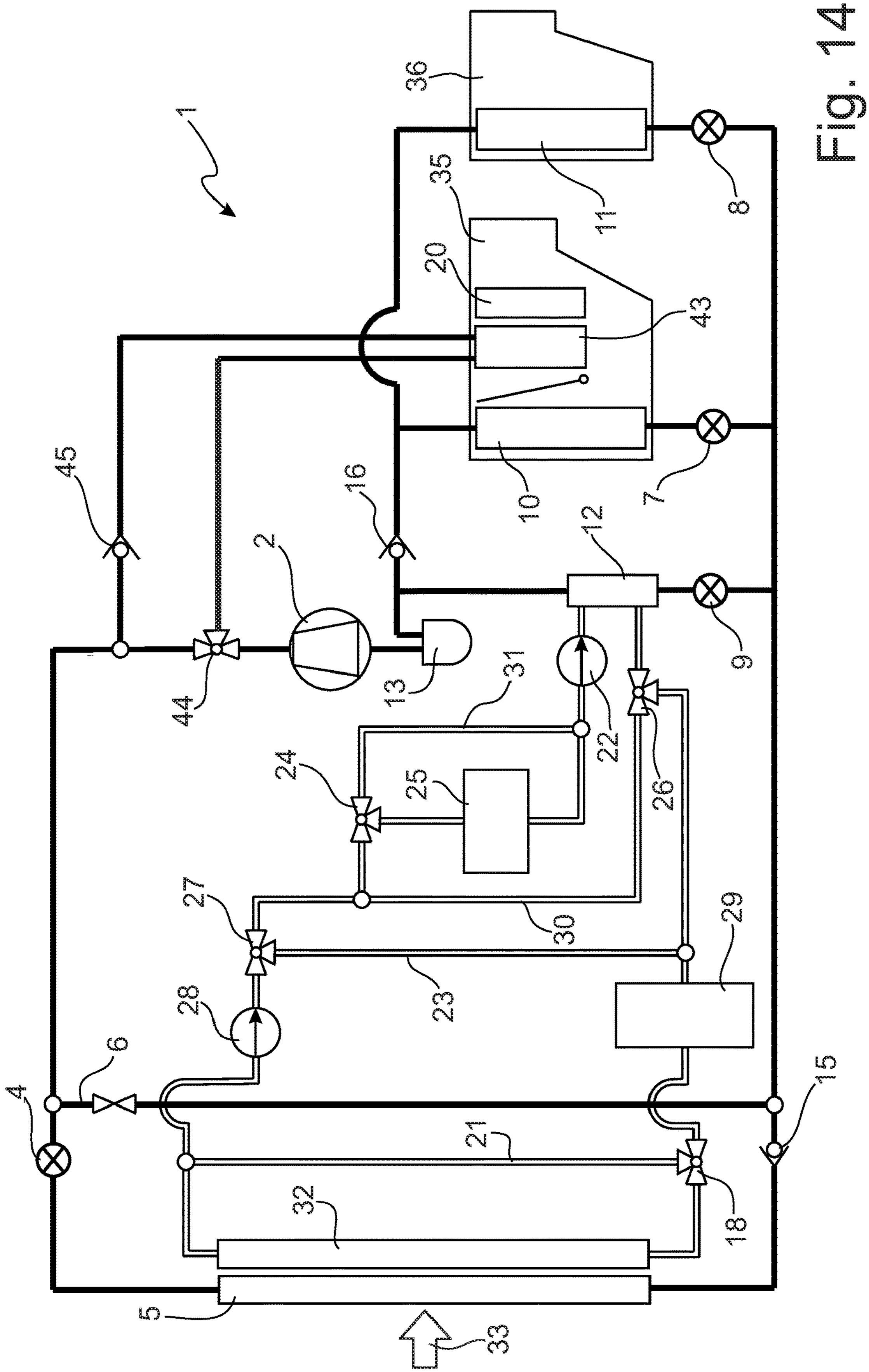
FIG. 14: Diagram of connections with internal condenser.

The succeeding variants of the heat flow management device 1 according to FIG. 13 and FIG. 14 include the modes shown so far and are expanded by further modes through variation in the components.

FIG. 13 depicts a diagram of connections with an expanded radiator capacity. The heating line heat carrier circulation is expanded through a heat carrier cooling radiator 41. The latter is connected parallel to the heating heat exchanger 19, for which purpose a 3-way valve 42 is provided downstream of the indirect condenser 3 in the heating line heat carrier circulation. Either the heat carrier cooling radiator 41 or the heating heat exchanger 19 or proportionately both can thus be operated.

However, the heat carrier cooling radiator 41 in a cooling mode can primarily contribute to an enhanced cooling performance and efficiency.

A not depicted variant comprises that an internal heat exchanger (IHX), also termed countercurrent subcooler, is integrated into the refrigerant circulation. This leads to the reduction of the necessary compressor performance in chiller operation. The relative cooling capacity of the interior evaporator, in comparison to the chiller, is herein effected in favor of the interior comfort without structural changes of the climate control unit. The internal heat exchanger thus increases once more the efficiency and extends furthermore the purely electrical range of a PHEV, HEV, EV by reducing the power requirement of the electric compressor of the refrigerant circulation.

FIG. 14 depicts a diagram of connections with internal condenser, which is also termed heating condenser 43 and which is integrated into the refrigerant circulation of the heat flow management device 1 across a 3-way valve 44, as well as a check valve 45. The heating line heat carrier circulation in this connection configuration is changed by the developing refrigerant loop downstream of the compressor 2 across the 3-way valve 44 toward the heating condenser 43 and across the check valve 45 to the precedingly described refrigerant circulation according to FIG. 1.

In heating operation the efficiency is increased due to the omission of the complexity and the transfer losses through the heating line heat carrier circulation.

Lastly, in FIG. 15 a diagram is shown with an overview over the temperature ranges and the operating modes of the heat flow management device 1. The temperature ranges are shown along a temperature scale starting at range A with the temperature range very cold ambient temperatures from −20° C. to −8° C. over the adjoining temperature range B, cold ambient temperatures up to 5° C., over the temperature range C with low ambient temperatures up to 17° C. up to the temperature range D with mild ambient temperatures up to 30° C. and lastly to the temperature range E with high ambient temperatures of more than 30° C. Assigned to the temperature ranges is the cabin conditioning with the cabin mode Heating F in a temperature range between minus 20 degrees Celsius and 5 degrees Celsius. Furthermore is depicted the cabin mode Reheat G correspondingly in the temperature range 5 degrees Celsius up to 30 degrees Celsius and the cabin operating mode Cooling H in the temperature range of more than 30 degrees Celsius and up. Lastly the battery operating modes are also categorized. The battery operating mode Heating K is applied from minus 20 to 0 degrees Celsius. The battery operating mode Passive Cooling L is between 0 degrees Celsius and approximately 25 degrees Celsius and the battery operating mode Active Cooling M starts at 25 degrees Celsius and up.

Depending on requirements, the refrigerant circulation can be controlled continuously between high pressure and low pressure to an intermediate pressure level depending on whether heat is to be absorbed into the refrigerant circulation or be output by it. This can be controlled sensitively without, for example, the temperature of the interior air noticeably decreasing.

The described and depicted heat flow management device 1, in particular in heat pump interconnection, in comparison to existing heat pumps, offers an enormous potential of feasible operating modes at a comparatively low requirement of components, such as heat exchangers and expansion elements. At comparatively low monetary expenditures, the heat flow management device 1 therefore significantly increases the potential purely electric range of electrically driven vehicles, such as, for example of PHEV, HEV and EV. The system is nevertheless highly controllable and can therefore be operated optimally in all operating modes and under all possible outside conditions as well as all cases of need such that the purely electrical consumption in operations by clients can be optimally implemented.

Furthermore, if applicable, a high-voltage water auxiliary heater is employed in order to support optionally the interior comfort or to heat the high-voltage battery. Both are potentially necessary at low outside temperatures.

The technical advantages in comparison to prior art comprise a high degree of exhaust or lost heat utilization, wherein the heating capacity is considerably higher since the suction density through the higher suction pressure is higher and consequently the refrigerant mass flow is greater. The system is of economic advantage compared to systems with electric auxiliary heater since savings are gained compared to far more complex refrigerant interconnections.

LIST OF REFERENCE SYMBOLS

1 Heat flow management device
2 Compressor
3 Indirect condenser
4 Expansion element
5 Ambient heat exchanger
6 Bypass with stop valve
7 Expansion element
8 Expansion element
9 Expansion element
10 Forward evaporator
11 Rearward evaporator
12 Chiller
13 Low-pressure collector
14 Stop valve
15 Check valve
16 Check valve
17 Coolant pump
18 3-way valve
19 Heating heat exchanger
20 Heating facility
21 Bypass
22 Coolant pump
23 Bypass
24 3-way valve
25 Battery cooler
26 3-way valve
27 3-way valve
28 Coolant pump
29 Electric motor heat exchanger
30 Bypass
31 Bypass
32 Power train coolant radiator
33 Ambient air
34 Bypass
35 Front climate control unit
36 Back climate control unit
37 Air temperature sensor
38 Refrigerant temperature sensor
39 Refrigerant pressure and temperature sensor
40 Coolant temperature sensor
41 Heat carrier cooling radiator
42 3-way valve
43 Heating condenser
44 3-way valve
45 Check valve
A Temperature range very cold ambient temperatures
B Temperature range cold ambient temperatures
C Temperature range low ambient temperatures
D Temperature range mild ambient temperatures
E Temperature range high ambient temperatures
F Cabin operating mode Heating
G Cabin operating mode Reheat
H Cabin operating mode Cooling
K Battery operating mode Heating
L Battery operating mode Passive Cooling
M Battery operating mode Active Cooling It is claimed:

1. A heat flow management device for motor vehicles, comprising a refrigerant circulation, a power train coolant circulation and a heating line heat carrier circulation, wherein the refrigerant circulation comprises a compressor, an indirect condenser, a first expansion element, an ambient heat exchanger, at least one evaporator with a second expansion element and a chiller with a third expansion element, the power train coolant circulation comprises a first coolant pump, the chiller, an electric motor heat exchanger and a power train coolant radiator, the heating line heat carrier circulation comprises a second coolant pump, the indirect condenser and a heating heat exchanger, wherein the refrigerant circulation and the power train coolant circulation are directly thermally coupled with one another across the chiller, wherein the refrigerant circulation and the heating line heat carrier circulation are directly thermally coupled with one another across the indirect condenser, and the power train coolant circulation and the heating line heat carrier circulation are only indirectly thermally coupled across the refrigerant circulation, wherein in the refrigerant circulation parallel to the indirect condenser a first bypass with a first stop valve is disposed, wherein in the refrigerant circulation a second bypass with a second stop valve is disposed parallel to the ambient heat exchanger, wherein in the power train coolant circulation a battery cooler is disposed, wherein in the power train coolant circulation a fifth bypass is disposed parallel to the battery cooler, and wherein a first 3-way valve is disposed downstream of the chiller, and the coolant selectively flows from downstream of the chiller to the electric motor heat exchanger or upstream of the battery cooler through the first 3-way valve.

2. The heat flow management device as in claim 1, wherein in the refrigerant circulation the at least one evaporator comprises two evaporators connected in parallel, wherein a first evaporator of the two evaporators is a forward evaporator is disposed in a front climate control unit and the other of the two evaporators is a rearward evaporator is disposed in a back climate control unit.

3. The heat flow management device according to claim 2, wherein in the refrigerant circulation the forward evaporator comprises the second expansion element and the rearward evaporator comprises a fourth expansion element.

4. The heat flow management device according to claim 2, wherein in the power train coolant circulation a third coolant pump is disposed.

5. The heat flow management device according to claim 4, wherein in the power train coolant circulation a third bypass is disposed parallel to the power train coolant radiator.

6. The heat flow management device according to claim 5, wherein in the power train coolant circulation a fourth bypass is disposed parallel to the third bypass across which a subcirculation with the electric motor heat exchanger, the power train coolant radiator and the third coolant pump is provided.

7. The heat flow management device according to claim 6, wherein in the power train coolant circulation a sixth bypass is disposed parallel to the fourth bypass across which a subcirculation with the chiller, the battery cooler and the first coolant pump is implemented and the power train coolant circulation is developed which is operable in two separate subcirculations that are operable independently of one another.

8. The heat flow management circulation according to claim 4, wherein in the front climate control unit, in addition to the heating heat exchanger, an additional heating facility is disposed.

9. The heat flow management device as in claim 8, wherein as the additional heating facility a PTC heating element is disposed in the front climate control unit.

10. The heat flow management device according to claim 8, wherein a control and regulation facility is implemented;

wherein in the refrigerant circulation:

a first refrigerant pressure and temperature sensor is disposed downstream of the compressor, a second refrigerant pressure and temperature sensor is disposed downstream of the ambient heat exchanger and a third refrigerant pressure and temperature sensor is disposed downstream of the chiller, and a refrigerant temperature sensor is disposed downstream of the evaporator; and wherein the power train coolant circulation:

a first coolant temperature sensor is disposed upstream of the third coolant pump, a second coolant temperature sensor is disposed upstream of the first coolant pump, and a third coolant temperature sensor is disposed downstream of the chiller; and wherein in the air flow:

a first air temperature sensor is disposed downstream of the forward evaporator, a second air temperature sensor is disposed downstream of the heating facility, a third air temperature sensor is disposed downstream of the rearward evaporator, and a fourth air temperature sensor is disposed upstream of the ambient heat exchanger.

11. The heat flow management device according to claim 1, wherein in the refrigerant circulation upstream of the compressor a low-pressure collector for the refrigerant is disposed.

12. The heat flow management device according to claim 1, wherein in the refrigerant circulation upstream of the ambient heat exchanger the first expansion element is disposed.

13. The heat flow management device according to claim 1, wherein in the heating line heat carrier circulation a heat carrier cooling radiator is disposed in parallel to the heating heat exchanger across a second 3-way valve.

* * * * *